US012482211B2

(12) United States Patent
Mclachlan et al.

(10) Patent No.: US 12,482,211 B2
(45) Date of Patent: Nov. 25, 2025

(54) EXTENDED REALITY OVERLAY OPTIMIZATION VIA DISTRIBUTED COMPUTING

(71) Applicant: Telefonaktiebolaget LM Ericsson (publ), Stockholm (SE)

(72) Inventors: Paul Mclachlan, San Francisco, CA (US); Héctor Caltenco, Oxie (SE); Fredrik Dahlgren, Lund (SE); Yun Li, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 239 days.

(21) Appl. No.: 18/566,599

(22) PCT Filed: Jun. 16, 2021

(86) PCT No.: PCT/IB2021/055344
§ 371 (c)(1),
(2) Date: Dec. 1, 2023

(87) PCT Pub. No.: WO2022/263892
PCT Pub. Date: Dec. 22, 2022

(65) Prior Publication Data
US 2024/0265661 A1 Aug. 8, 2024

(51) Int. Cl.
*G06T 19/00* (2011.01)
*G06T 7/20* (2017.01)
(Continued)

(52) U.S. Cl.
CPC ............... *G06T 19/20* (2013.01); *G06T 7/20* (2013.01); *G06V 20/20* (2022.01);
(Continued)

(58) Field of Classification Search
CPC ............ G06T 19/20; G06T 7/20; G06V 20/20
See application file for complete search history.

(56) References Cited

U.S. PATENT DOCUMENTS 8,200,617 B2   6/2012  Spivack et al.
8,909,648 B2  12/2014  El-Yaniv et al.
(Continued)

FOREIGN PATENT DOCUMENTS

WO    2018/115934 A1   6/2018
WO    2022/023788 A1   2/2022
WO    2022/023789 A1   2/2022

OTHER PUBLICATIONS

Anonymous, "Extended Reality (XR) Market, 2025, Growth Rate, Industry Size, Share, Trends, Growth Factors," Jan. 10, 2020, 7 pages, MarketWatch.
(Continued)

*Primary Examiner* — Thomas J Lett
(74) *Attorney, Agent, or Firm* — Nicholson De Vos Webster & Elliott LLP

(57) ABSTRACT

A method of a user device to track objects in an extended reality (XR) environment includes capturing an image of a physical environment associated with the XR environment, sending the image, a first timestamp for the image, and object information for at least one object in the image to a tracking service, receiving an object identifier, object tracking information, and a second timestamp for the at least one object from the tracking service, performing time and motion compensation on the object tracking information to correlate the object tracking information and object identifier with the at least one object in the image of the physical environment, and generating or updating an XR overlay for the at least one object using time and motion compensated object tracking information.

20 Claims, 18 Drawing Sheets

(51) Int. Cl.
*G06T 19/20* (2011.01)
*G06V 20/20* (2022.01)
(52) U.S. Cl.
CPC .............. *G06T 2207/20076* (2013.01); *G06T 2207/30236* (2013.01); *G06T 2219/2004* (2013.01)

(56) References Cited

U.S. PATENT DOCUMENTS

| | | | |
|---|---|---|---|
| 9,524,434 | B2 | 12/2016 | Gee et al. |
| 9,541,383 | B2 | 1/2017 | Abovitz et al. |
| 9,672,206 | B2 | 6/2017 | Carus et al. |
| 10,075,813 | B1 | 9/2018 | Struhsaker et al. |
| 10,115,232 | B2 | 10/2018 | Miller et al. |
| 10,235,450 | B2 | 3/2019 | Thomas |
| 10,267,924 | B2 | 4/2019 | Ramanandan et al. |
| 10,321,182 | B2 | 6/2019 | Herz |
| 10,424,065 | B2 | 9/2019 | Armeni et al. |
| 10,565,773 | B1 | 2/2020 | Tytgat |
| 11,288,319 | B1 | 3/2022 | Das et al. |
| 2003/0061028 | A1 | 3/2003 | Dey et al. |
| 2003/0233451 | A1 | 12/2003 | Ludvig et al. |
| 2010/0183192 | A1 | 7/2010 | Fritsch et al. |
| 2010/0211649 | A1 | 8/2010 | Dimas et al. |
| 2013/0290234 | A1 | 10/2013 | Harris et al. |
| 2016/0260255 | A1 | 9/2016 | Bean et al. |
| 2016/0314622 | A1 | 10/2016 | Davis et al. |
| 2016/0378861 | A1 | 12/2016 | Eledath et al. |
| 2017/0161546 | A1 | 6/2017 | Cansizoglu et al. |
| 2017/0201585 | A1 | 7/2017 | Doraiswamy et al. |
| 2017/0256071 | A1 | 9/2017 | Laugier et al. |
| 2017/0339099 | A1 | 11/2017 | Levy-Abegnoli et al. |
| 2018/0160330 | A1 | 6/2018 | Frydman et al. |
| 2018/0182475 | A1 | 6/2018 | Cossler et al. |
| 2018/0336732 | A1 | 11/2018 | Schuster |
| 2019/0068461 | A1 | 2/2019 | Barkie et al. |
| 2019/0147220 | A1 | 5/2019 | Mccormac et al. |
| 2019/0204092 | A1 | 7/2019 | Wheeler |
| 2019/0238952 | A1 | 8/2019 | Boskovich |
| 2019/0319868 | A1 | 10/2019 | Svennebring et al. |
| 2019/0339688 | A1 | 11/2019 | Cella et al. |
| 2019/0363951 | A1 | 11/2019 | Vasseur et al. |
| 2019/0368868 | A1 | 12/2019 | Abovitz et al. |
| 2020/0005542 | A1 | 1/2020 | Kocharlakota et al. |
| 2020/0026076 | A1 | 1/2020 | Beckman |
| 2020/0069210 | A1 | 3/2020 | Berenzweig et al. |
| 2020/0120446 | A1 | 4/2020 | Stammers et al. |
| 2020/0136994 | A1 | 4/2020 | Doshi et al. |
| 2020/0160534 | A1 | 5/2020 | Labbe et al. |
| 2020/0225673 | A1 | 7/2020 | Ebrahimi et al. |
| 2020/0302510 | A1 | 9/2020 | Chachek et al. |
| 2020/0404078 | A1 | 12/2020 | Iyer et al. |
| 2020/0410751 | A1 | 12/2020 | Omari et al. |
| 2021/0099547 | A1 | 4/2021 | Han et al. |
| 2021/0110191 | A1* | 4/2021 | Gruteser .............. G06N 3/0464 |
| 2021/0117697 | A1 | 4/2021 | Guim et al. |
| 2021/0263779 | A1 | 8/2021 | Haghighat et al. |
| 2021/0321413 | A1 | 10/2021 | Shin et al. |
| 2023/0351704 | A1 | 11/2023 | Mclachlan et al. |
| 2024/0104171 | A1* | 3/2024 | Cardona .............. G11B 27/10 |
| 2024/0195789 | A1 | 6/2024 | Doshi et al. |
| 2024/0212225 | A1* | 6/2024 | Lin .................. H04N 21/42202 |

OTHER PUBLICATIONS

Cheng—Edge caching and computing in 5G for mobile augmented reality and haptic—2020—Elsevier (Year: 2020).
Zhou et al—Ad Hoc Networks—2007—Springer (Year: 2007).
Craig Schlenoff et al., "An approach to predicting the location of moving objects during on-road navigation," 2003, 10 pages, downloaded from https://tsapps.nist.gov/publication/get_pdf.cfm?pub_id=824436.
Dirk Schulz et al., "Probabilistic state estimation of dynamic objects with a moving mobile robot," 2001, pp. 107-115, Robotics and Autonomous Systems 34, downloaded from http://www2.informatik.uni-freiburg.de/~burgard/postscripts/web-editions.
Ericsson ConsumerLab and IndustryLab, "5G Consumer Potential: Busting The Myths Around The Value of 5G For Consumers," May 2019, 16 pages, downloaded from https://www.ericsson.com/498f26/assets/local/reports-papers/consumerlab/reports/2019/5g-consumer-potential-report.pdf.
Ericsson ConsumerLab, "Merged Reality: Understanding How Virtual and Augmented Realities Could Transform Everyday Reality," Jun. 2017, 12 pages, downloaded from https://www.ericsson.com/4a2c58/assets/local/reports-papers/consumerlab/reports/2017/ericsson_consumerlab_merged-reality_report_aw-screen.pdf.
Kenneth Research, "Global Extended Reality (XR) Market," Nov. 2019, 3 pages, downloaded from https://www.kennethresearch.com/sample-request-10195901 on Aug. 25, 2020.
Stephan Gammeter et al., "Server-side object recognition and client-side object tracking for mobile augmented reality," 2010, pp. 1-8, Computer Society Conference on Computer Vision and Pattern Recognition—Workshops, IEEE.
Wenxiao Zhang et al., "CloudAR: A Cloud-based Framework for Mobile Augmented Reality," May 8, 2018, 13 pages, downloaded from https://arxiv.org/pdf/1805.03060.
Wikipedia, "VR positional tracking," May 10, 2021, pp. 1-10.
Yuebin Yang et al., "Multiple Object Tracking with Kernelized Correlation Filters in Urban Mixed Traffic," 2017, pp. 209-216, 2017 14th Conference on Computer and Robot Vision.
Alina Kloss et al., "Combining Learned and Analytical Models for Predicting Action Effects from Sensory Data," Oct. 12, 2020, 18 pages, downloaded from https://arxiv.org/pdf/1710.04102.
ETSI TS 129 572 V15.1.0, "5G; 5G System; Location Management Services; Stage 3 (3GPP TS 29.572 version 15.1.0 Release 15)," Oct. 2018, 36 pages, ETSI.
Li et al—Statistical Modeling of Complex Backgrounds for Foreground Object Detection—200411—IEEE (Year: 2004).
Sekiyama et al—Event_recognition_using_object_motion_context—2010—IEEE (Year: 2010).
Vegard Flovik, "How do you teach physics to machine learning models?," Aug. 23, 2018, 14 pages, Towards Data Science, downloaded from https://towardsdatascience.com/how-do-you-combine-machine-learning-and-physics-based-modeling-3a3545d58ab9.

* cited by examiner

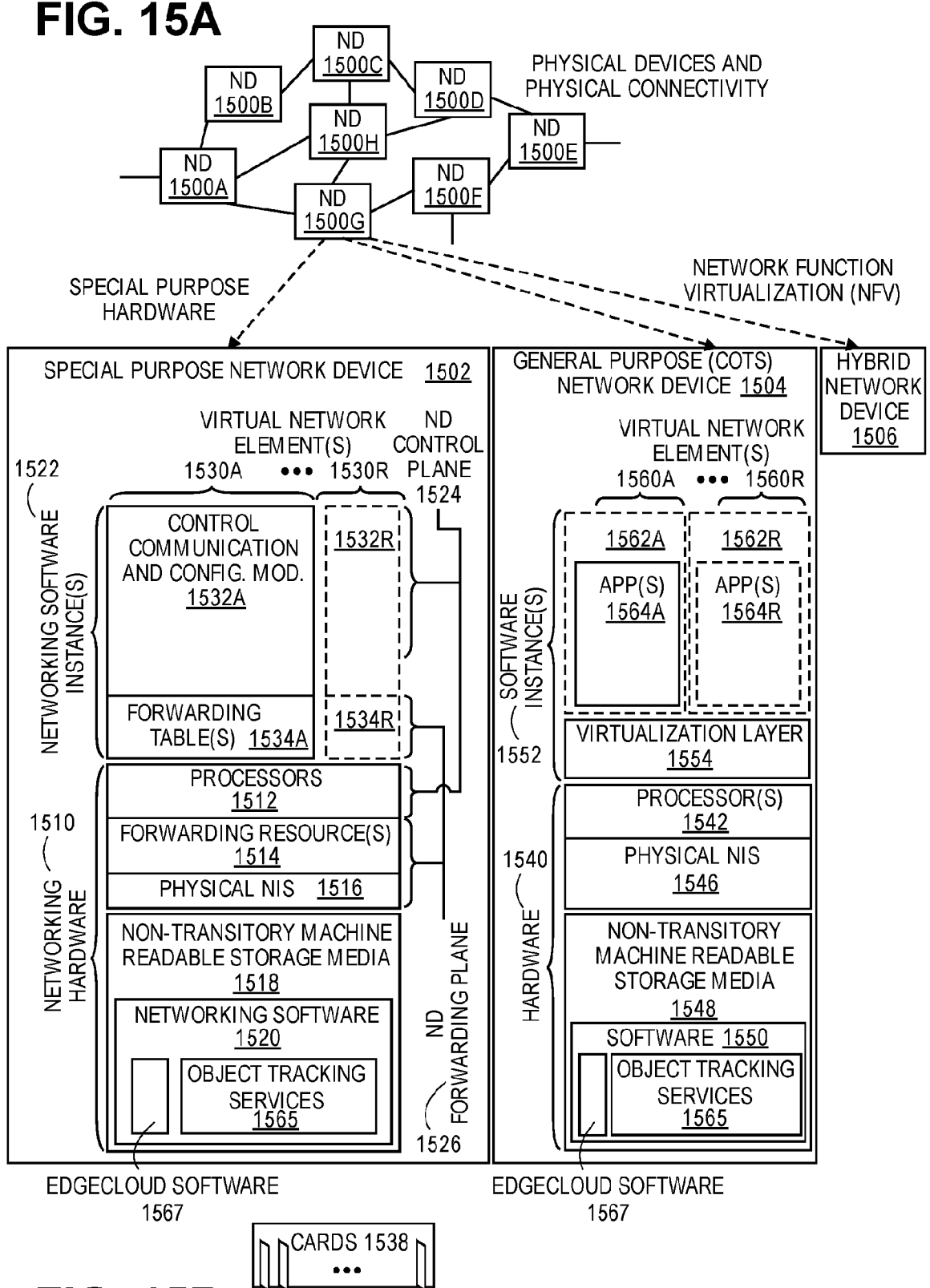

EXTENDED REALITY OVERLAY OPTIMIZATION VIA DISTRIBUTED COMPUTING

CROSS-REFERENCE TO RELATED APPLICATIONS

This application is a National stage of International Application No. PCT/IB2021/055344, filed Jun. 16, 2021, which is hereby incorporated by reference.

TECHNICAL FIELD

Embodiments of the invention relate to the field of extended reality rendering; and more specifically, to a system and process for optimizing overlay placement in connection with extended reality rendering.

BACKGROUND ART

Augmented reality (AR) augments the real world and the physical objects in the real world by overlaying virtual content. This virtual content is often produced digitally and may incorporate sound, graphics, and video. For example, a shopper wearing augmented reality glasses while shopping in a supermarket might see nutritional information for each object as they place it in their shopping cart. The glasses augment reality with information.

Virtual reality (VR) uses digital technology to create an entirely simulated environment. Unlike AR, which augments reality, VR immerses users inside an entirely simulated experience. In a fully VR experience, all visuals and sounds are produced digitally and do not include input from the user's actual physical environment. For example, VR may be integrated into manufacturing where trainees practice building machinery in a virtual reality before starting on the real production line.

Mixed reality (MR) combines elements of both AR and VR. In the same vein as AR, MR environments overlay digital effects on top of the user's physical environment. MR also integrates additional, richer information about the user's physical environment such as depth, dimensionality, and surface textures. In MR environments, the end user experience more closely resembles the real world. As an example, consider two users hitting a MR tennis ball on a real-world tennis court. MR incorporates information about the hardness of the surface (grass versus clay), the direction and force the racket struck the ball, and the players' height. Augmented reality and mixed reality are often used to refer to the same idea. As used herein, "augmented reality" also refers to mixed reality. Extended reality (XR) is an umbrella term referring to all real-and-virtual combined environments, such as AR, VR and MR. XR refers to a wide variety and vast number of levels in the reality-virtuality continuum of the perceived environment, consolidating AR, VR, MR and other types of environments (e.g., augmented virtuality, mediated reality, etc.) under one term.

An XR user device is the device used as an interface for the user to perceive both virtual and/or real content in the context of extended reality. An XR user device typically has a display that may be opaque and displays both the environment (real or virtual) and virtual content together (i.e., video see-through) or overlay virtual content through a semi-transparent display (optical see-through). The XR user device may acquire information about the environment through the use of sensors (typically cameras and inertial sensors) to map the environment while simultaneously tracking the device's location within the environment.

Object recognition in extended reality is mostly used to detect real world objects and for triggering the digital content. For example, the consumer would look at a fashion magazine with augmented reality glasses and a video of a catwalk event would play in a video instantly. Note that sound, smell, and touch are also considered objects subject to object recognition. For example, a diaper ad could be displayed as the sound and perhaps when the mood of a crying baby is detected. Mood could be deducted from machine learning applied to sound data.

SUMMARY

In one embodiment, a method of a user device to track objects in an extended reality (XR) environment includes capturing an image of a physical environment associated with the XR environment, sending the image, a first timestamp for the image, and object information for at least one object in the image to a tracking service, receiving an object identifier, object tracking information, and a second timestamp for the at least one object from the tracking service, performing time and motion compensation on the object tracking information to correlate the object tracking information and object identifier with the at least one object in the image of the physical environment, and generating or updating an XR overlay for the at least one object using time and motion compensated object tracking information.

In a further embodiment, a network device includes a non-transitory machine-readable medium having stored therein an object tracking service, and a processor coupled to the non-transitory machine-readable medium. The processor executes the object tracking service. The object tracking service executes the method of a user device to track objects in an extended reality (XR) environment including capturing an image of a physical environment associated with the XR environment, sending the image, a first timestamp for the image, and object information for at least one object in the image to a tracking service, receiving an object identifier, object tracking information, and a second timestamp for the at least one object from the tracking service, performing time and motion compensation on the object tracking information to correlate the object tracking information and object identifier with the at least one object in the image of the physical environment, and generating or updating an XR overlay for the at least one object using time and motion compensated object tracking information.

In another embodiment, a method of an object tracking service tracks objects in an extended reality (XR) environment which includes receiving an image, object information, and a first timestamp from a first user device, performing object identification on the image, determining an object identifier for at least one object in the image, determining position compensation information for the at least one object, updating a motion probability field (MPF) based on the position compensation information, the at least one object, and object information, and sending the object identifier, object tracking information including the MPF, and a second timestamp to the first user device.

In a further embodiment, a network device includes a non-transitory machine-readable medium having stored therein an object tracking service, and a processor coupled to the non-transitory machine-readable medium. The processor executes the object tracking service. The object tracking service executes the method of tracking objects in an extended reality (XR) environment which includes receiving an image, object information, and a first timestamp from a first user device, performing object identification on the image, determining an object identifier for at least one object in the image, determining position compensation information for the at least one object, updating a motion probability field (MPF) based on the position compensation information, the at least one object, and object information, and sending the object identifier, object tracking information including the MPF, and a second timestamp to the first user device.

BRIEF DESCRIPTION OF THE DRAWINGS

The invention may best be understood by referring to the following description and accompanying drawings that are used to illustrate embodiments of the invention. In the drawings:

FIG. 15A illustrates connectivity between network devices (NDs) within an exemplary network, as well as three exemplary implementations of the NDs, according to some embodiments of the invention.

FIG. 15B illustrates an exemplary way to implement a special-purpose network device according to some embodiments of the invention.

DETAILED DESCRIPTION

Figure 1:
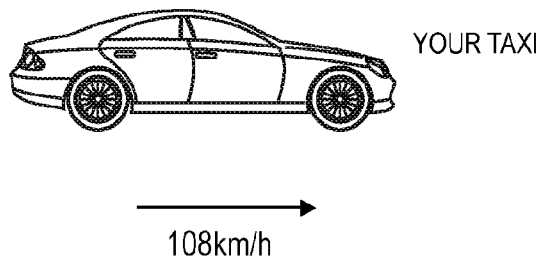
FIG. 1 is a diagram of a fast moving object that illustrates issues related to the extended reality overlays introduced by network, processing and rendering latency.
Figure 1:
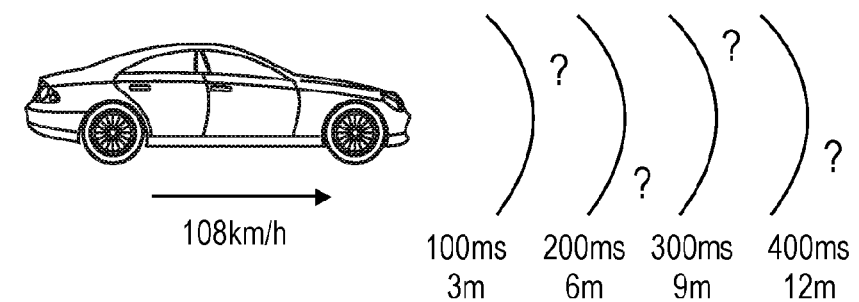

The following description describes methods and apparatus for improving the operation of extended reality applications by assisting these applications in predicting the movement of objects for optimized extended reality (XR) overlay placement. The methods and apparatus position motion probability fields (MPFs) in edgecloud resources and facilitate the retrieval and usage of these MPFs to enable the extended reality applications to improve rendering of digital overlays at the extended reality devices. As used herein, the 'edgecloud,' refers to any combination or distribution of computing resources providing a cloud system or cloud services at or near the 'edge' of a mobile communication network (e.g., networks providing cellular communication services such as those based on 3rd Generation Partnership Project (3GPP), 4G, 5G New Radio (NR) and similar services and technologies). The edge of the mobile communication network can be at a base station or similar location and/or similar set of computing resources. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments provide a method and system to combine local sensor data (i.e., data collected at an XR user device) and on-device tracking with motion probability field (MPF) information to position and display an optimized real-time XR overlay of object information. The embodiments utilize MPFs such as static MPFs (S-MPF) or dynamic MPFs (D-MPFs).

An S-MPF and/or D-MPF can be used to improve the prediction of the placement of XR overlays in an XR environment. An S-MPF is estimated using static features of the environment, such as building location and other pre-mapped infrastructure. No real-time environmental information is used for S-MPF estimation. A D-MPF integrates information of a dynamic XR environment streamed real time from the XR user device. After processing the real time audio, video, and other data types in the edgecloud, the resulting D-MPF updates in real time. This D-MPF is utilized to optimize XR overlay placement using real-time data, such as moving objects in the environment. The system of the embodiments can use high speed or low latency technologies (e.g., 5G New Radio and/or Wi-Fi) to minimize errors in overlay placement.

In the embodiments, the XR user device is configured to optimally use limited processing capabilities by locally performing resource-efficient identification and tracking of candidate objects and relying on the edgecloud for more resource intensive object identification and tracking. The optimized overlay placement process of the embodiments utilizes the local object tracking data, which is then combined with more accurate information about target objects as well as MPF data from the edgecloud. The embodiments overcome a challenge of how the MPF information is combined with the data from the XR user device. The embodiments also overcome another challenge that arises from the fact that the information from the edgecloud has a certain age caused by the transmission latencies as well as the age of the data from which it was derived. The embodiments provide a method and system to anticipate these latencies in predicting tracked object position to thereby improve XR overlay placements at the XR user device.

The embodiments present a method and system to use spatial mapping and scene understanding through computer vision and artificial intelligence technologies to predict the optimal placement of visual and other overlays in extended reality and compensate for network, processing and rendering latency. The embodiments utilize an architecture that benefits from improved latency and speed of 5th Generation New Radio (5G NR) by the 3rd Generation Partnership Project (3GPP) to incorporate image, video, audio, and position data into the estimation of dynamic motion probability fields for overlay placement optimization.

The embodiments overcome the problems of the existing art. 5G New Radio (NR) supports dozens of new use cases for consumers and enterprise. Supporting augmented reality (AR) and virtual reality (VR), herein referred to collectively as extended reality (XR) is one of 5G NR's key use cases. By laying critical information, insights, and predictions over an end user's field of vision, XR provides value for consumers and enterprise users and is forecast to grow rapidly. Widespread adoption of XR, and unlocking its commercial potential, requires addressing four key technical impediments. The first relates to streamlining XR user devices' form factors. Currently, XR user devices perform most of their computation and data processing on the XR user device. To enable this computation, today's XR user devices integrate powerful, battery-draining electronic circuits. XR user devices also have large batteries, resulting in physically large and heavy product design. The second challenge is how to streamline these physical forms. To reduce the need for large circuit boards and batteries, XR user devices must conduct ever more processing at the edge of the connected mobile network and/or in the cloud (hereinafter, "the edgecloud"). Thirdly, XR user devices must be connected to mobile and/or Wi-Fi networks that are sufficiently fast to stream large amounts of data with minimal latency.

The fourth technical impediment is placing overlays on top of the correct object. While this problem can be addressed by using computer vision and object detection when objects are unique and stationary, it is a tremendous challenge when a scene has multiple, visually similar objects or objects that move. Moving objects could be located within space by having the object stream its location in the form of latitude, longitude, and altitude obtained via global positioning system (GPS). GPS solutions do not work well under certain conditions and have limitations in determining altitude, but other ways of locating objects are possible. Radio positioning (e.g., Bluetooth beacons) or marker-based positioning technologies can also be used but requires specific infrastructure. Using visual identifiers (e.g., QR codes) can help locate specific objects relative to the camera position, but these are prone to occlusion. Moreover, these data sources are highly sensitive and lack controls to restrict or control accessing the location information that they produce, which has broad privacy implications.

These challenges can be addressed by XR user devices having access to high speed, low latency mobile and/or Wi-Fi networks. Prior to the introduction of 5G NR, earlier mobile networks lacked the capability to directly address these four challenges. For instance, 4G Long Term Evolution's (LTE) upload and download speeds are insufficient to stream uncompressed high definition (HD) audio and video. While audio and video compression codecs allow these data to be streamed over 4G LTE, the loss in fidelity poses challenges for computer vision and artificial intelligence (AI). 4G LTE's latency, moreover, is too high to allow XR user devices to push most data processing into the edgecloud. As even small changes in an end user's posture affect the placement of visual overlays, any perceptible lag will diminish the end user experience.

The speed and latency standards in 5G NR 3GPP (e.g., Release 15) solve the speed and latency impediments to widespread XR adoption. The embodiments build on these improvements to introduce a solution to the problem of placing visual overlays in an end user's field of vision. The embodiments build on an architecture that incorporates differential privacy to allow for time-delimited access to position information and position information purging. In some cases, even with 5G NR's low latency, the architectures of the mobile network or Wi-Fi network can be too slow to correctly place visual overlays. This problem is particularly acute when objects move quickly (for example, cars on a freeway) or with inconsistent patterns of movement (for example, athletes). The embodiments introduce an architecture and method to process semantic data (e.g., visual, auditory, position, and sensory data) in the edgecloud, and dynamically predict where an overlay should be placed.

FIG. 1 is a diagram of a moving object that illustrates issues related to the extended reality overlays. The diagram shows the range for a visual overlay for a vehicle traveling at 108 kilometers an hour at different levels of latency. The vehicle in the top panel has an extended reality (XR) overlay situated directly above the vehicle. The XR application may consider this placement to be an ideal placement of an XR overlay for a vehicle (e.g., in this case the car has an ObjectID=A123456) that is to be rendered by an XR application when the user of the XR user device is viewing the vehicle. While ideal placement might depend upon the object, XR application design, the end user, and the use case, the embodiments can accommodate any preferred or ideal position for the XR overlay. The bottom panel of FIG. 1 panel shows the uncertainty range over where the ideal placement would be, given minimal changes in network latency. In the example, if there is 100 milliseconds (ms) of latency, then the XR overlay may be 3 meters off the ideal placement. If there is 200 ms of latency, then the displacement may be 6 meters. Similarly, the displacement is 9 meters and 12 meters for latency of 300 ms and 400 ms, respectively.

The embodiments provide a method and apparatus to optimize solutions for the problem of correctly placing visual overlays in XR renderings by XR applications on XR user devices. In particular, the embodiments provide methods and apparatus to distribute object identification and tracking between XR user devices and the edgecloud as well as account for the latencies between the XR user devices and the edgecloud. The embodiments improve overlay placement in combination with processes that integrate spatial mapping and scene understanding into artificial intelligence (AI) and machine learning workflows. The embodiments can work in conjunction with processes that assign a motion probability field (MPF) to each object. Each object is assigned a unique identifier (e.g., an ObjectID). Each MPF describes the probability a given object will move next over a space. An MPF integrates contextual information about the object (e.g., maximum speed, range of motion, physical size, and similar information). This type of MPF does not incorporate real-time conditions, thus, this MPF is static and used to reduce the potential range within a field of view for overlay placement. In the architecture of the embodiments, object placement algorithms can access an MPF as the algorithms run in the edgecloud.

The embodiments utilize an architecture that benefits from the next generation of low latency and high-speed networks (e.g., 5G NR and/or Wi-Fi) to localize physical items (hereinafter, "objects") within a defined space in real-time. These physical items, i.e., objects, are associated with electronic devices capable of communicating with a mobile network to share information with other electronic devices connected to the mobile network. For example, a taxi can either have an embedded device or can associate with a mobile handset device of a driver. 'Objects' as discussed herein encompass both the physical object, e.g., a taxi, and the associated electronic device that enables its connectivity with the mobile network.

Figure 2:
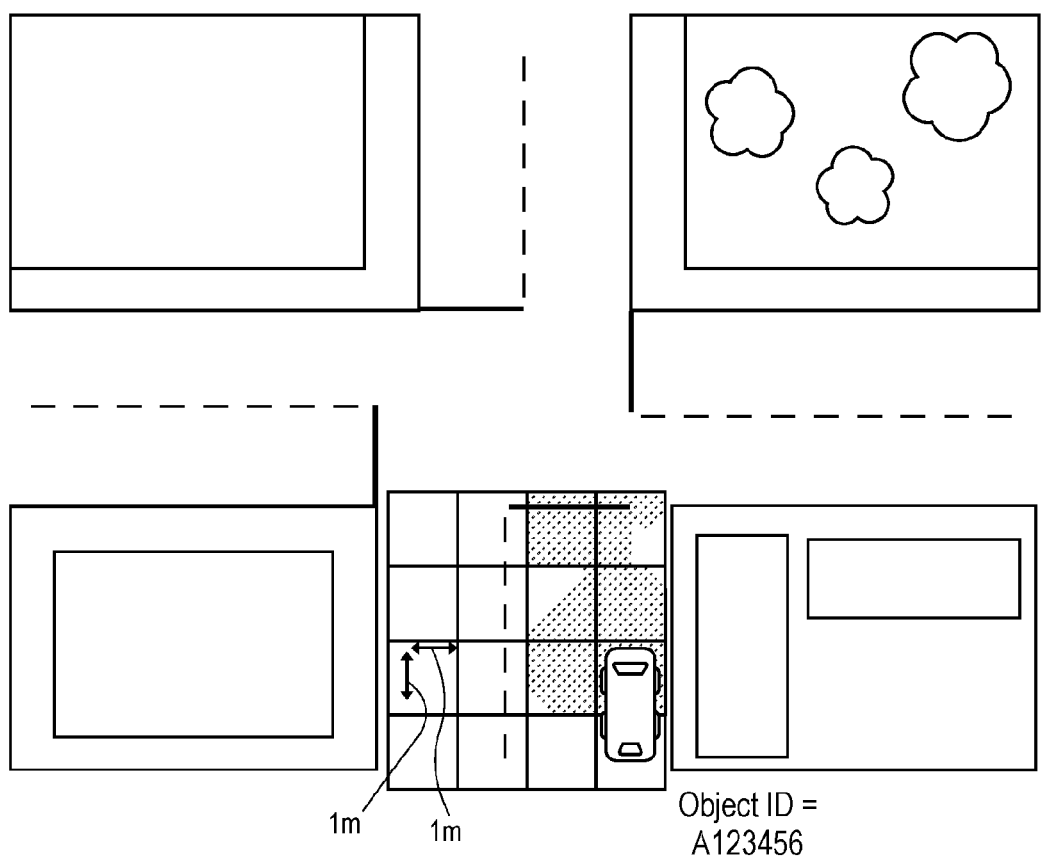
FIG. 2 is a diagram of another example case illustrating the use of a motion probability field (MPF) of an identified object for predicting where to render an XR overlay.

FIG. 2 is a diagram of another example case illustrating the use of an MPF for predicting where to render an XR overlay. The example is a bird's eye view of a street scene where either a dynamic MPF (discussed below) or static MPF for a vehicle (ObjectID=A123456) is applied. The example shows the probability the vehicle will move forward (or potentially forward and to the side) more than it will move backwards. The MPF can correlate to a space around the object into which the object can possibly move. The area of the space around the object is divided into a set of three dimensional spaces.

The architecture can utilize a global shared real world mapping system. The real world mapping system can divide the real world into a two or three dimensional grid. In one embodiment, a cubic 1-meter grid over the surface of the planet is determined and each cubic meter is assigned a unique alphanumeric identifier. In other embodiments, other sizes and shapes are utilized and assigned a unique alphanumeric identifier. The unique alphanumeric identifier can be referred to as a location identifier (LocID). However, in other embodiments, any size, shape, or configuration of a real-world mapping can be utilized. The example of a cubic representation is described herein by way of example and not limitation.

Similarly, the use of LocIDs is described herein as a mechanism to locate objects, however, one skilled in the art would understand that the principles, processes, and structures described herein are fully compatible with other demarcations of location such as latitude, longitude, and altitude. As mentioned, a LocID uniquely identifies a location (e.g., a cube or similar shape) within a spatial mapping system that is correlated with the real world. Any type of location identifier can be used with the embodiments; the example of the LocID is used herein by way of example and not limitation. Within the edgecloud, each object is assigned an alphanumeric ObjectID that uniquely identifies it. Each object then uploads its location and other data into the edgecloud, in response to changes in that data, at regular intervals, or in response to other events. In some embodiments, to improve efficiency, all location information is matched to the closest LocID. Unless otherwise noted, the terms "location" and "position" may be used interchangeably herein.

Returning to the illustrated example, the MPF correlates with the grid of cubes or similar spatial mapping to determine a probability that the object can move into nearby locations (e.g., cubes) in the subsequent given time frame. In this example, the object cannot go immediately to the right or backward, since it is currently moving toward the intersection. The MPF indicates probabilities that the object (i.e., the vehicle) will be in the illustrated locations (i.e., cubes) at the next timing interval. The grey shaded cubes indicate higher probability and the unshaded cubes lower probability.

Benefitting from the low latency and high speed of 5G NR, the architecture of the embodiments also allows for the dynamic estimation of MPFs (D-MPF). Unlike a static MPF, a D-MPF applies semantic understanding to real-time data (e.g., live audio and video and weather data) uploaded into an edgecloud environment. After estimation, D-MPFs can be integrated into AI and machine learning models to improve overlay placement prediction. Further, the low latency and high speed of 5G NR allow XR user devices to access a dynamically predicted range of motion for each object with a visual overlay. After processing real-time semantic and scenario data uploaded from the XR user device to the edgecloud, the embodiments assign each object with an overlay with a temporally and situationally dynamic overlay range. Finally, these fields are anonymized and stored in the edgecloud to improve estimation efficiency. While the illustrated example utilizes 100 ms end-to-end latencies, real-world conditions where 5G NR is applied could be in the range of 10 to 30 ms (e.g., 20 ms) for end-to-end latency.

Figure 3:
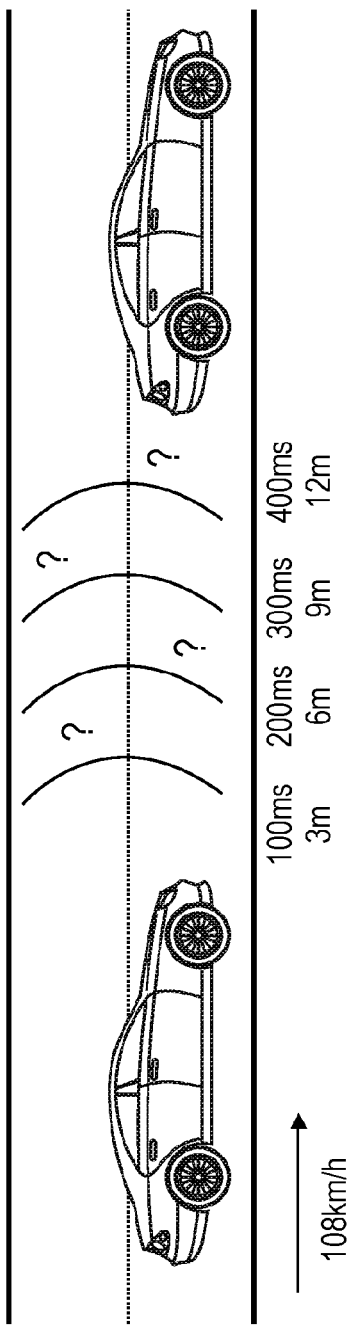
FIG. 3 is a diagram of another example case illustrating issues for predicting where to render an XR overlay given the location of a second detected vehicle to constrain the potential range of the XR overlay.

FIG. 3 is a diagram of another example case where a vehicle is moving at 108 kilometers an hour. The diagram shows the value of dynamically processing semantic data to constrain the potential range of a visual overlay. The example shows how real-time contextual information can be used to improve placement of overlays. In this scenario, the presence of the second vehicle in front of the target vehicle narrows down the possible range where an overlay could be placed. This information is integrated into the real-time dynamic motion probability field (D-MPF) as described further herein. Any algorithms can be used to estimate an object's potential range of motion. These algorithms can utilize any available source of location information and object state information such as acceleration, range, and physical limitations of the object. To that end, the embodiments provide a method for gathering this contextual data and an architecture for processing the contextual data. The embodiments can be utilized with any static-MPF (S-MPF), D-MPF or similar structures. Similarly, the embodiments can work with any algorithms intended to estimate, generate, update, or otherwise update or maintain an S-MPF or a D-MPF using any available information.

Similarly, the embodiments can be utilized in combination with any computer vision, artificial intelligence, or other applications for semantic understanding of physical environments. Such applications can be related to measuring occlusion, object detection, and semantic mapping for a variety of use cases, including mapping indoor small cells and digital advertising in XR. On their own, these applications are insufficient for the use cases described herein, as they neither integrate with a privacy-preserving architecture nor are they suitable for predicting overlays in XR. These applications, moreover, do not use 5G NR's latency and speed to allow for both static and dynamic mapping of probability fields.

The following features are missing from these applications: the ability to incorporate image, video, spatial, audio, and location data derived from XR hardware and devices together with MPF data and object information from the edgecloud for purposes of carrying out visual overlay placement for XR purposes; mechanisms for taking system latencies and age of data into consideration when combining local sensor data, on-device tracking, and edgecloud data; the ability to predict ideal location for visual overlay placement in the XR user device by a combination of local tracking and the movement range of an object and in the dynamic case other objects in real time; combination of low-power light-weight object tracking with more advanced analytics in the edgecloud taking the latency and uncertainty into consideration; and handling of temporary (and partial) occlusion of target objects by the support of complementary information from the edgecloud.

The embodiments address the deficiencies in the art and provide processes and systems for optimizing XR overlay placement that more efficiently utilize XR user device and edgecloud computing resources for object identification and tracking, as well as processes and system for accounting for latencies related to the distribution of these processes between the XR user device and edgecloud. In the embodiments, an S-MPF and/or D-MPF is used to improve the placement of overlays by an XR application. In the S-MPF case, the S-MPF is estimated using static features of the environment, such as building location information and other infrastructure location information. No real-time environmental information is used for static MPF estimation. The D-MPF integrates information of a dynamic environment streamed real time from the XR user device. After processing the real time audio, video, and other data types in the edgecloud, the resulting D-MPF updates in real time. This architecture uses 5G NR and/or Wi-Fi to minimize errors in overlay placement.

Figure 4:
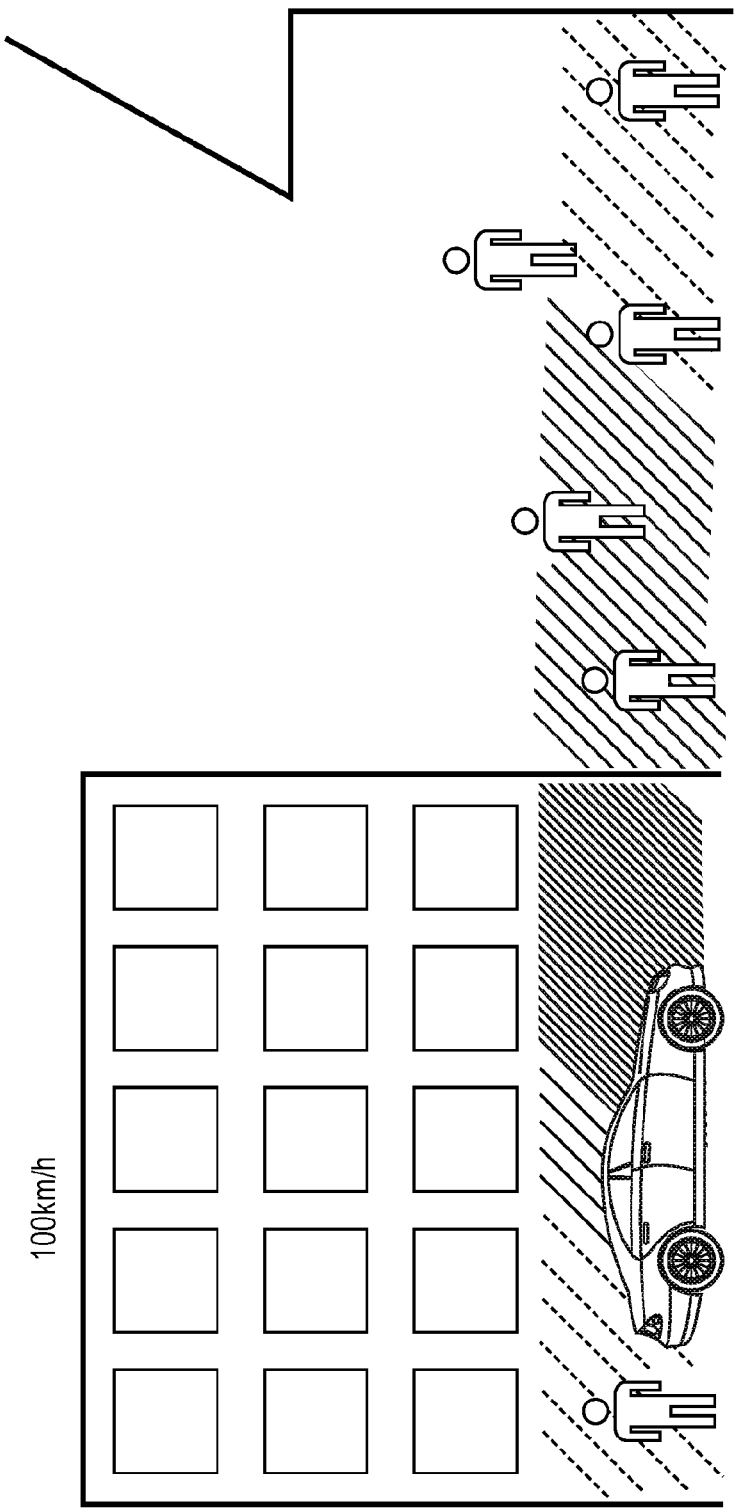
FIG. 4 is a diagram of one embodiment of a motion probability field applied to an example vehicle in a street environment.

FIG. 4 is a diagram of one embodiment of a motion probability field applied to an example vehicle in a street environment. When scanning a scene for purposes of placing a visual overlay in XR, the optimal overlay location estimation predicts a location a use case-defined distance away from the relevant object. The ideal location for an XR overlay is relative to an object, in terms of how far above, below, and how far away, and is likely to vary depending upon the use case, end user preference, and adaptation to factors such as occlusion, bright light, and similar environmental factors. Any method and system can be used for defining and implementing XR overlay placement relative to the object and the associated preferences and configuration.

In the architecture of the embodiments, every object is assigned an ObjectID that is associated with it, and the XR application is able to access a motion probability field (MPF) that is stored within the edgecloud for that object. Depending upon the use case, a global, national, or regional MPF is produced and geospatially relevant subsets from the master MPF are stored within the edgecloud. For purposes of network, machine learning computational efficiency and privacy, an object only has access to the subset of the MPF that is within an arbitrary distance (e.g., in meters) from the object. This arbitrary distance parameter will depend upon the use case, speed of the object, and network connectivity. Any method and system can be used for determining an optimal method for setting the arbitrary distance parameter and associated parameters.

An MPF can be defined, broadly, as a geospatially-defined vector field of penalty or reward scores for movement. In non-technical terms, this means each pairwise combination of geospatial coordinate (latitude, longitude, and altitude) or similar location information (e.g., a LocID) and object type is assigned a likelihood of travel ranging from 0 to 1 or using a similar range. When 0, there is no probability a given object can move to that geospatial coordinate or location. For example, a vehicle cannot move hundreds of meters vertically above the street. Thus, locations above a certain height can be given a 0. When 1, there is a 100% probability a given object will move along the predicted range.

In the illustrated example, the slanted lines indicate different probabilities that the vehicle with ObjectID A123456 will be at these locations in the next time frame. In the example, the vehicle can be traveling at 100 kilometers an hour. The denser the lines, the more likely the MPF indicates it is that the vehicle will travel to that location in the next time frame given certain network, processing, and rendering latency. In the case where the MPF is dynamic, the D-MPF also integrates information about pedestrians and their current location into its estimation. The static case would not integrate such real time information and only uses information available in a spatial map or model as well as motion dynamics of the object receiving the overlay. Any method or process can be used to generate or predict an MPF (e.g., a S-MPF or D-MPF). XR application developers, mobile network operators, or others can specify preferred processes and methods for generating the MPFs. Example processes are described herein. Any combination or set of specific features can be included in the model to estimate either a D- or S-MPF. Once calculated, the resulting D-MPF or S-MPF can be included within the metadata associated with a particular environment XR and stored in the edgecloud.

The embodiments provide advantages over the art by optimizing placement of visual overlays for purposes of XR. The advantages include reducing the amount of data streamed to the edgecloud for purposes of XR placement optimization. While the improvement in efficiency may be small for each individual XR experience, the cumulative impact across the mobile network can significantly reduce resource usage and reduce network complexity. The advantages further include improving XR overlay placement. The improved placement makes media significantly more appealing in the XR environment. For example, the economic impact of this can affect advertising in the XR environment. The advertising can be divided into two types: digital and traditional. Digital advertising, or the display of advertising on electronic devices, is one of the world's largest industries. Improving the quality of the XR environment experience can extend to all XR overlay-based content including visual guides, mapping, and consumer information. If XR environments become popular partly due to the quality of the experience, then advertising in this environment can generate significant revenues. Currently XR content is expensive to create and is not yet standardized into a platform. 4G LTE is generally too slow to process the large file sizes of XR content without significant delays, resulting in poor end user experiences. The latency in 4G LTE and earlier network generations is too high to process data in real-time, further degrading end user experience. 5G NR solves these technical limitations, and the embodiments support standards around XR content in terms of content creation, serving, and corresponding architecture. Application of the embodiments for XR environments can support growth in the XR market. The embodiments improve end user experience in XR environments by using the latency and speed of 5G NR to improve visual overlays. This improves experiences for XR app developers, end users, and XR user device manufacturers.

The embodiments provide a new way to improve overlay placement for XR purposes by: incorporating image, video, spatial, audio, and position data derived from XR hardware and user devices together with MPF data and object information from the edgecloud for purposes of carrying out visual overlay placement for XR purposes; introducing mechanisms to account for system latencies and age of data into consideration when combining local sensor data, on-device tracking, and edgecloud data: predicting ideal position for visual overlay placement in the XR user device by a combination of local tracking and the movement range of an object and in the dynamic case other objects in real time; combining low-power light-weight object tracking with more advanced analytics in the edgecloud taking the latency and uncertainty into consideration; handling of temporary (and partial) occlusion of target object by the support of complementary information from the edgecloud.

The embodiments provide an architecture that has the following advantages: speed, scalability, flexibility, context, and dimensionality. In this context, speed is provided by 5G NR in combination with the edgecloud, which allows for XR user devices to access a motion probability field stored in the edgecloud in the static case, and upload visual, audio, spatial, and position data in the dynamic case. The architecture is scalable since it is designed to operate via integration with the edgecloud. The architecture is flexible since any type of network connected XR user device can access MPFs stored on the edgecloud as well as use data obtained from the device. By improving visual overlay placement, the embodiments facilitate customized XR overlays and context for each end user. The embodiments improve Dimensionality by supporting three-dimensional rendering in the XR environment and thereby improving placement of visual overlays.

Figure 5:
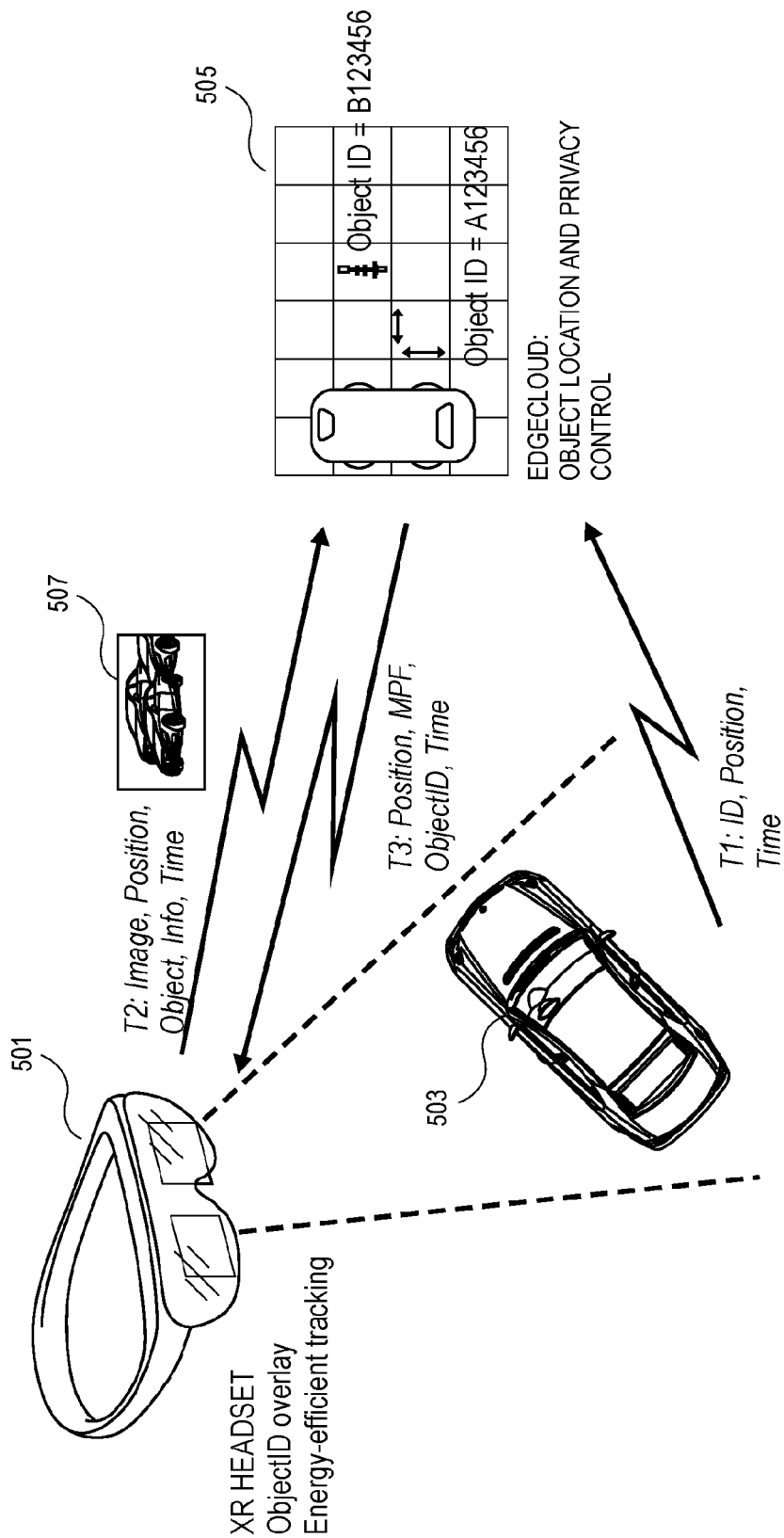
FIG. 5 is a diagram of one example embodiment of a system for supporting an XR environment with optimized XR overlay generation.

FIG. 5 is a diagram of one example embodiment of a system for supporting an XR environment with optimized XR overlay generation. In this example system, there is an XR user device 501. The XR user device 501 can include visual sensors such as cameras that are directed forward that capture images of the physical environment. The XR user device 501 can also potentially include sensors such as cameras to detect the user's gaze. The XR user device 501 can support positioning functions and services, e.g., global positioning system (GPS), or similar positioning services and technologies. The XR user device 501 can potentially include an inertial measurement unit (IMU), compass or other types of sensors to detect movement and direction. The XR user device 501 can include a communication device, e.g., 5G, capable of communicating wirelessly with the edgecloud or similar communication technology. The XR user device 501 can include a see-through display or similar display, through which an XR overlay (e.g., an ObjectID) can be displayed on the relevant objects that are identified and tracked.

In the illustrated example, the object to be tracked is a yellow cab that is in communication with the edgecloud. The XR user device 501 can identify and track the object (i.e., the yellow cab 503) using energy efficient object identification and tracking techniques. The yellow cab 503 also communicates its position and object identifier (i.e., ObjectID) to the edgecloud 505, e.g., via a base station (not shown), at time T1. The edgecloud 505 can track the reported object position using an MPF or similar structure. The XR user device 501 can send an image 507, position, object information, and a first timestamp to the edgecloud 505, e.g., via a base station, at time T2. The edgecloud can perform advanced object detection and/or identification in response to receiving the data from the XR user device 501. The edgecloud 505 can send position, MPF, object identifier (ObjectID), and a second timestamp to the XR user device, e.g., via a base station, at T3. The XR user device 501 can then utilize the information from the edgecloud 505 to predict the position of the tracked object adjusted for the latencies between the XR user device 501 and the edgecloud 505 based on the timestamps.

Figure 6:
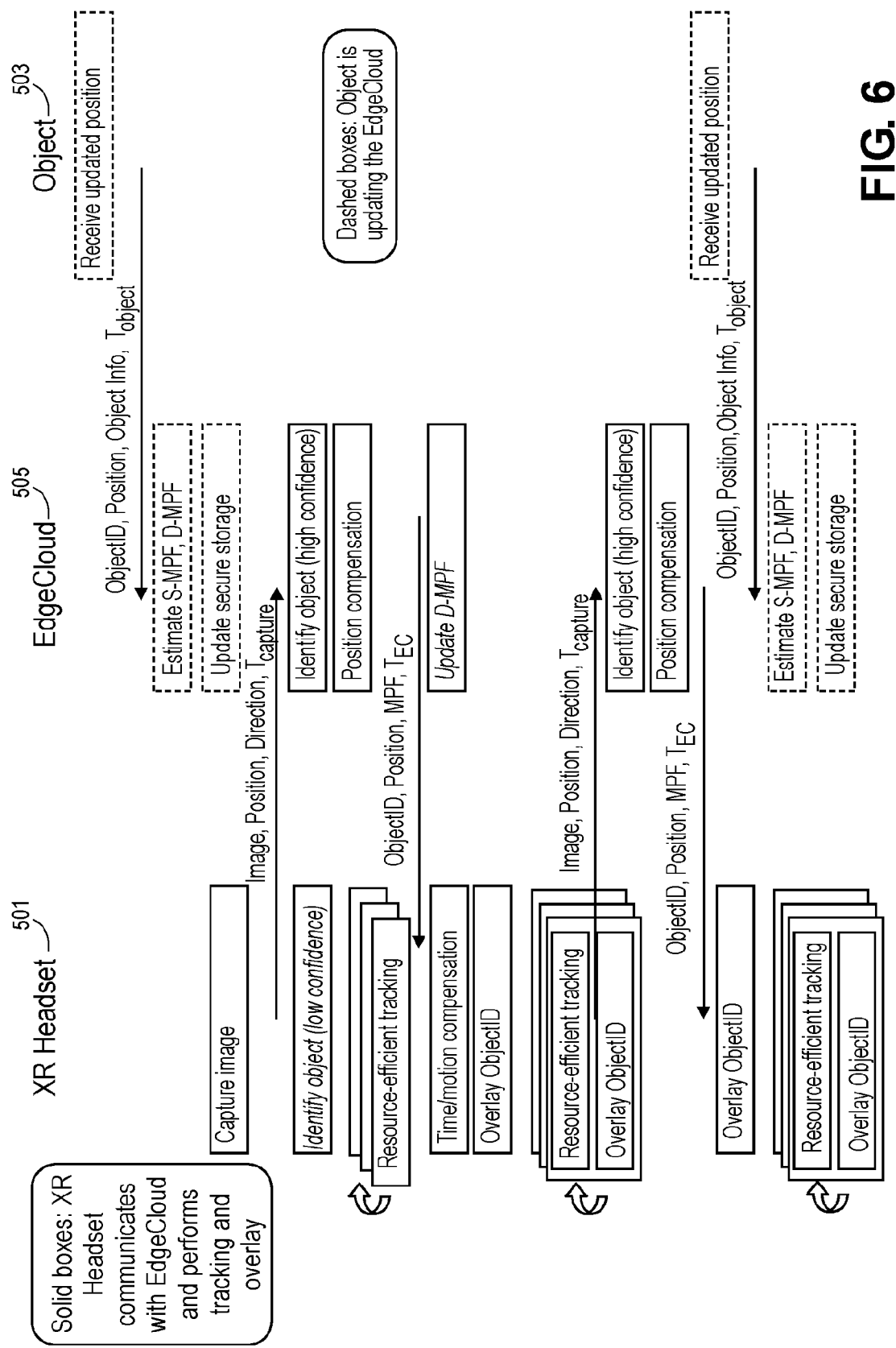
FIG. 6 is a diagram of one embodiment of the process and actions of the XR user device, edgecloud, and external inputs showing the functionality split and communication between these components.

FIG. 6 is a diagram of one embodiment of the process and actions of the XR user device 501, edgecloud 505, and external inputs (i.e., object information 503) showing the functionality split and communication between these components. The illustrated set of actions are provided by way of example and not limitation. One skilled in the art would understand that the processes and functions shown can vary depending on the case or context. In some embodiments, one or more communications between the edgecloud 505 and the XR user device 501 and/or the object 503 may be transmitted via one or more base stations, which are not illustrated in FIG. 6.

Generally, the functionality split between the XR user device 501 and the edgecloud 505 involves energy efficient functions being performed at the XR user device 501 and more computationally and energy intensive functions being performed at the edgecloud 505. The XR user device 501 can collect sensor input, perform low-confidence (resource constrained) object detection, and track one or more candidate objects using resource-efficient tracking in real time. The XR user device 501 can send and receive information to/from the edgecloud 505. The XR user device 501 can receive information from the edgecloud 505 including timestamps or similar information that can compensate for time duration or latencies that can be inherent to the S-/D-MPF received from the edgecloud 505. The XR user device 501 can confirm tracked objects or identify objects to track based on the information received from the edgecloud 505. The XR user device can generate an XR overlay (e.g., an ObjectID) based on information from the edgecloud 505 (compensated based on tracking), local tracking information (as long as compliant with S-/D-MPF), calculated latencies, and similar factors.

The edgecloud 505 can function to track objects using MPF and similar structures. The data related to each tracked object can be secure or private object information when provided by the object itself. The edgecloud 505 can compute semantic map data with known three dimensional position information for objects, user devices, and similar entities. The edgecloud can perform object detection, S-/D-MPF estimation, and similar resource intensive operations to offload these operations from XR user devices.

In the example of FIG. 6, an object 503 generates or receives updated position information (e.g., directional information received from sensors associated with the object 503). The object 503 is a real-world object associated with a device in communication with the edgecloud 505 (e.g., a yellow cab with a user device running an application that provides position information to the edgecloud 505). The information that is sent to the edgecloud 505 can include an ObjectID, position information, object information, and a timestamp ($T_{object}$) that correlates with the time the data is sent to the edgecloud 505. The position information can be any information indicating position, direction, speed, or similar positional information related to the object. The object information can be any information about the characteristics of the object.

The edgecloud 505 receives this information from the object and utilizes this information to update any MPF that maintains information about that object including range of motion or motion prediction information related to the object. The received information can also be stored in a shared or secret storage (e.g., encrypted storage) for use maintaining MPF, semantic mapping, and related tracking structures. The edgecloud 505 can also receive information from the XR user device 501. The XR user device 501, in this example, has captured an image of the physical environment in which it is operating. In addition, the XR user device 501 has captured or received sensor input for position, direction, orientation, timestamps of the image captured ($T_{capture}$). This information is processed by the XR user device 501 and sent to the edgecloud 505. The XR user device 501 performs a low resource object identification process to identify any number of objects in the image for tracking. The objects are tracked at the XR user device 501 while the edgecloud 505 processes the image, e.g., in parallel. Any object identification process (e.g., machine-learning based processes) can be performed such that resource and energy usage at the XR user device 501 are less than that which would be used at the edgecloud 505. The edgecloud uses object identification processes (e.g., machine-learning based processes) for object identification that are more resource intensive and provide a higher accuracy or confidence than the processes of the XR user device 501. Object classification and detection methods can include any convolutional neural network (CNN) based methods such as ResNet. Examples can include Faster R-CNN, kernelized correlation filter (KCF)2 and Kalman filter trackers. While the update of object information from the object and XR user device are shown in an example sequence, these processes are independent and asynchronous to one another.

As used herein, object identification is a special case of object detection where object detection involves the determination of an object class, confidence, and location of objects in a scene or image, sometimes represented by a bounding box around the object. Object identification operates such that every object instance detected has a unique identity, which can be denoted by an "object ID." Class labels, as used herein, identify types of object classes that can be identified as part of the object identification. For example, a class label can be "chair" Class identifiers (IDs), as used herein, are numeric identifiers of the class label in question, e.g., a class ID for the class label "chair," can be "62". In some embodiments, the definitions of the common objects in context (COCO) dataset are utilized for the class labels, class identifiers, object identifiers, and similar aspects. As used herein, the class identifiers and labels are different than an object ID, an object ID is unique and identifies a specific instance of an object detected. The object ID can have the class ID embedded within the object ID or similarly associated. For example, a specific instance of a chair can be "62001," another chair can be "62002" where the "62" in each object ID indicates the class ID and the 001 or 002 identifies the respective instance.

In some embodiments, the edgecloud 505 performs position compensation by using the timestamp of the captured image and current time to predict the position of the object at the current time or near future. An MPF gives information on the probability of movement into a position in the next time period (unit time) in a two dimensional or three dimensional space around the current object position. By utilizing information on delta time (time since MPF to actual time), this information can be combined to assess most likely positions and determine a predicted position. The predicted position can be used to update the MPF and similar tracking structures maintained by the edgecloud 505. The edgecloud 505 returns the object identifier (ObjectID), position information, MPF, and timestamp (TEC) for each object detected or being tracked on behalf of the XR user device 501.

The XR user device 501 performs a time and motion compensation based on the received data and timestamp. The XR user device 501 can predict the current position of the identified objects using the resource efficient tracking and edgecloud 505 provided data along with the timestamps. The positional information and directional information along with the latencies determined by the relative timestamp information can be processed to predict the position of the identified objects in a current time, for example, with a high confidence. This predicted position can then be used by the XR user device to generate and display an XR overlay for the object, which displays any information about the object (e.g., the ObjectID or related information). In this manner the XR overlay positioning and display can be more accurate in terms of object identification and positioning. Models for object classification and detection used herein can generate confidence levels, e.g., a value between 0 and 1, where any threshold can be set for a valid classification or detection. In some embodiments, a value above 60% (e.g., 0.6) can be considered a valid classification or detection. Similarly, a high confidence value can be a confidence value well above the 60% valid threshold such as 75% or higher, which can be a configurable value.

The object 503 as well as the XR user device 501 can each asynchronously continue to provide updated position information, captured sensor, and image data, or related data for objects as well as the physical environment around the XR user device 501. This information is processed by the edgecloud 505 to update the MPF and related tracking structures, perform object identification, position compensation, and return updated object information to the XR user device 501. This process can continue indefinitely and shift as objects enter and leave the physical environment around the XR user device 501. Objects that are just occluded from the view of the XR user device 501 can continue to be tracked in particular if they are self-reporting information about their position.

The functions of the XR user device 501, edgecloud 505, object 503 and related components for updating the MPFs, object identification, time/motion/position compensation, latency determination, and related functions can be implemented by XR overlay services at each of the respective devices, and more specifically by object tracking services within the XR overlay services.

Figure 7:
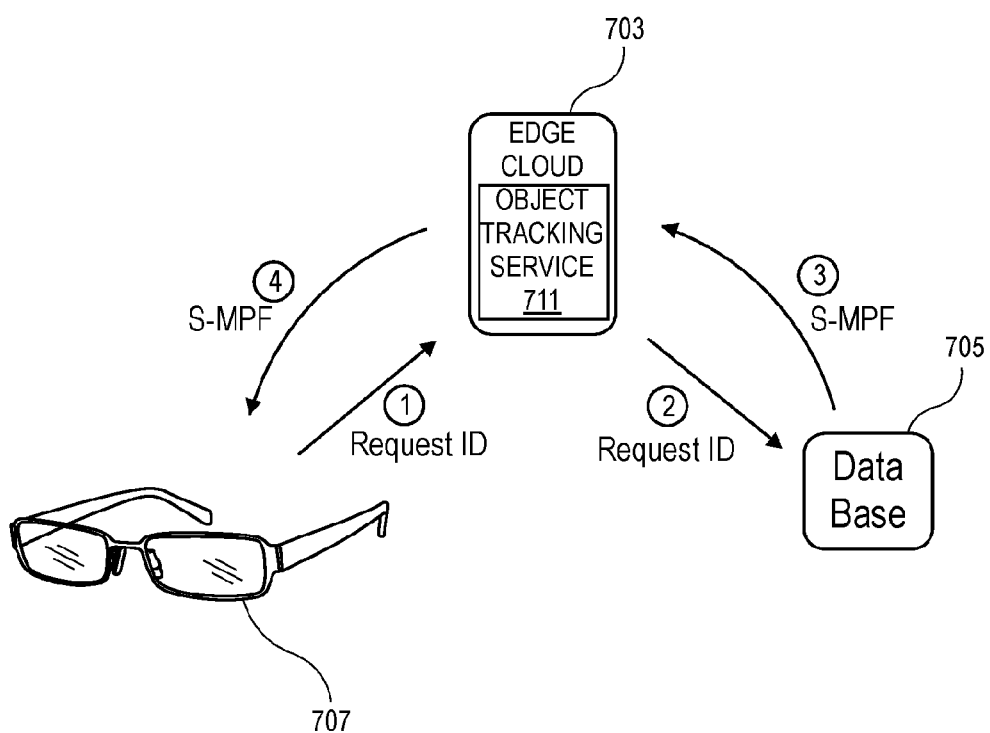
FIG. 7 is a diagram of one embodiment of the architecture of the edgecloud based XR overlay service.

FIG. 7 is a diagram of one embodiment of the architecture of the edgecloud based XR overlay service. As noted earlier, the terms "location" and "position" may be used interchangeably. In some embodiments, one or more communications between the XR user device 707 and the edgecloud 703 and/or the object tracking service 711 may be transmitted via one or more base stations. This diagram illustrates how an XR application on an XR user device 707 accesses a motion probability field, for example, a static-motion probability field (S-MPF) and/or a dynamic motion probability field (D-MPF) stored in the edgecloud 703 or a database 705 associated with the edgecloud. One such way an XR user device 707 can access a D-MPF or S-MPF is by generating a RequestID. Once a RequestID is generated, it contains information about the location of the XR user device 707, for example geo-spatial coordinates. This information then allows the XR user device 707 to receive the relevant D-MPF or S-MPF from the edgecloud 703 and/or database 705. The RequestID can be a message format or similar data structure with location information for the XR user device 707 that is sent to the edgecloud 703. The edgecloud 703 and/or database 705 can then identify the portion of the MPF relevant (i.e., nearby) the XR user device 707 and return that portion of the MPF to the XR user device 707 and the XR application therein. The XR application at the XR user device 707 can then utilize the MPF in support of determining how to place visual overlays using any algorithm or placement process.

Prior to the architecture being utilized to provide an MPF, the objects connected with the mobile network and the edgecloud 703 report location information as well as location information retention limits Each object connected to the mobile network of the edgecloud 703 is assigned an ObjectID and broadcasts its location information to the edgecloud 703. The ObjectID can be assigned, generated, reset, or regenerated by the object, by the edgecloud 703, or a resource (e.g., database system 705) associated with the edgecloud 703. In some embodiments, the objects can share their location data at varying times. Objects can share location information at any frequency. For example, objects can share location information responsive to changes in location, at fixed intervals, continuously, or any variation or combination thereof. In some embodiments, users or administrators associated with the objects can set the frequency and, in some cases, can manually toggle location sharing on and off (e.g., via a graphical user interface (GUI) on the device or an application associated with the electronic device of the object). Once enabled, location data can be sent as a message, reported, streamed, pushed/pulled, or similarly transmitted via 5G NR, Wi-Fi, or technologies of earlier mobile network generations to the nearest edgecloud environment 703. The location information can be shared using any protocol or format. In one example embodiment, location information is shared in the form of an array containing the ObjectID, location (either as latitude, longitude and altitude, LocID or other type of location identifier), and any other fields that may be required to share additional information.

The location data arrays are processed in the edgecloud 703 and retained in a database 705. If location data is shared in a raw format (e.g., latitude and longitude), these datapoints are assigned to their nearest LocID and the raw data are purged. The collected location information can be utilized at the edgecloud 703 to update MPFs, in particular, D-MPFs. The location information provides information about the environment of the XR user device 707 and any object that is to have an XR overlay associated with it. As an object moves in space, new options for further movement become possible based on whether they are blocked by terrain, other objects, structures, or other obstacles. The continuous updating of local object location information enables the MPFs to accurately model the probabilities of the movement of the associated objects.

Further to the description of an edgecloud discussed herein above, the edgecloud 703 is a set of electronic devices and resources positioned in proximity to base stations, cells, towers, or similar transmission component in the radio access network (RAN) of the 5G NR mobile network, similar mobile network technologies, earlier mobile network technologies and any combination therewith. The edgecloud services and devices are administered by a mobile network operator (MNO) or similar entity. For sake of clarity and conciseness, the edgecloud 703 services and devices are represented as a single point of contact in the illustration. However, the edgecloud 703 services and devices are distributed over a wide area of a mobile network. Transitioning between connected edgecloud devices as an object or XR user device 707 moves through the area of coverage of the mobile network is transparent for purposes of the XR overlay service and is handled by the handover process of the mobile network.

Similarly, the database system 705 in which ObjectID, location information, and other object information are stored can be co-located with edgecloud devices or resources or can have a low latency connection with the edgecloud devices or resources. The database system 705 can have any format or organization such as an associative or object-oriented database system or other type of database system that is capable of storing and associating ObjectIDs with the appropriate location and object information as it is reported by the objects to the edgecloud 703. Likewise, the MPFs stored in the database 705 can be stored in any format or structure therein according to the organization and operation of the database 705. The database 705 can be distributed over any number of locations and devices to ensure a low latency availability to the XR overlay services of the edgecloud 703.

The architecture of the embodiments enables applications, websites, and other services and tools to access MPFs retained in the edgecloud 703 and database 705 and utilize in their operations. Applications can be executed on any electronic device (e.g., on an XR user device 707) that uses the mobile network to transmit requests for MPFs associated with objects to servers controlled by the MNO or the application or jointly administered with the application. In some embodiments, the applications (e.g., XR applications) running on an XR user device 707 operate in conjunction with services and functions (e.g., servers) that execute in the edgecloud 703 such that these services and functions are provided by any combination of the developer of the application, which is deployed to the edgecloud 703, and services and functions provided by the MNO, for example as part of XR overlay, object tracking services 711, or other services. The XR overlay services, as used herein, refers to any combination of MNO and developer functions and services deployed to the edgecloud 703 to support the functions the broader XR environment operations described herein. The object tracking services 711, as used herein, refers to any combination of MNO and developer functions and services deployed across the edgecloud 703, XR user devices 707, objects, and similar component to perform the operations described herein including object tracking, object identification, and XR overlay optimization. An XR user device 707, as used herein, refers to any electronic device that is utilized to render XR via a display, haptic feedback, or other output device and which can include cameras, sensors, positional devices, or other input devices to collect information about the real world around the electronic device.

The XR applications (e.g., at an XR user device 707) can access specific MPFs associated with specific objects by generating a RequestID containing information about the physical location of the XR user device 707. The XR user device 707 uploads the RequestID into the edgecloud 703. The RequestID is used to identify the relevant MPF or forwarded to a database to access the relevant MPF (e.g., a S-MPF or D-MPF stored within the database 705). The requested MPF or a portion thereof is returned to the edgecloud 703 by the database 705 or retrieved from a local cache or electronic device of the edgecloud 703. The MPF or a relevant portion thereof is then returned by the edgecloud 703 to the XR user device 707.

The RequestID is used as part of a lookup process by the edgecloud 703 or database 705. An XR application or related services or functions can send a RequestID that identifies the XR application or associated XR user device to the XR overlay service and/or object tracking service 711, which includes a lookup or similar service or in other embodiments the lookup process or service is separate from the XR overlay service and/or object tracking service 711. The lookup process can identify MPFs that are associated with an ObjectID specified in the RequestID as well as MPFs that are relevant to the location of the XR user device 707.

After the lookup process, the matching MPFs or portions thereof are returned to the XR user device 707 via the XR overlay services and/or object tracking services 711 of the mobile network. Each RequestID can include specific fields including information about the application requesting the data, as well as a prefix, the ObjectID, the billing type for data transfers (not shown in Table I), the time limit (e.g., in hours) for data retention, a checksum, and similar data. An example of the format of the RequestID is shown below in Table I.

TABLE I

| ABCDEFG | 000001 | ABC1234567 | 0002 | 0001 |
|---|---|---|---|---|
| Application | 6 Digit Prefix | ObjectID | Time Limit | Checksum |

In the example RequestID, the first field (e.g., seven characters) uniquely identifies the application associated with or that generated the RequestID, a 6 Digit Prefix can be a grouping or type for the object, padding, or similar information, the ObjectID uniquely identifies the object whose MPF is to be retrieved, the time limit (e.g., in hours) is the amount of time the data related to the RequestID can be retained in a database or at the edgecloud, and the checksum is used to validate the RequestID. In this example, the resulting RequestID is ABCDEFG000001ABC123456700020001, which uniquely identifies the requesting application. All data retained in the edgecloud 703 related to this RequestID, and the ability of the XR application and/or device 707 to access data in the edgecloud related to this RequestID are purged after the specified time period expires. Other information or formats can be used for RequestIDs. The format described herein above is provided by way of example and illustration and not limitation. Other fields and information can be included, and other types of data structures can be used to organize this data.

In the diagram of FIG. 7, the flow of data is shown in four stages. In the first stage, an XR application on the XR user device 707 sends a request to the XR overlay services and/or object tracking service 711 or application specific services at the edgecloud 703 and/or database 705 identifying an object for which an overlay is to be determined. The XR overlay services and/or object tracking service 711 perform a lookup based on the ObjectID of the target object identified in the RequestID. The XR overlay services, object tracking service 711, or application specific services can locally search based on the ObjectID and/or forward the search to the database 705 (second stage). The lookup identifies any MPFs that are available for the ObjectID. MPFs, can be associated with specific individual ObjectIDs, or can be associated with types of objects. In addition, the MPFs can be limited (i.e., a portion of the MPF can be identified) to an area adjacent to the XR user device 707 and the current location of the object associated with the ObjectID.

In response to the RequestID, which includes an ObjectID of an object for which the MPF is requested, the MPF is retrieved from the database 705 (stage three) and is sent to the XR overlay services and/or object tracking services 711 at the edgecloud 703. In the fourth state, the MPF (e.g., an S-MPF) for the object is returned by the XR overlay service and/or object tracking service 711 to the XR user device 707. Once the time limit for the RequestID expires, the edgecloud 703 and/or database 705 purges information related to the XR user device, XR application, and the request from the database 705 and/or edgecloud 703. Similarly, if a time limit for the ObjectID expires, the location data and other data associated with the ObjectID including the MPF are purged from the edgecloud 703 and the database 705.

Figure 8:
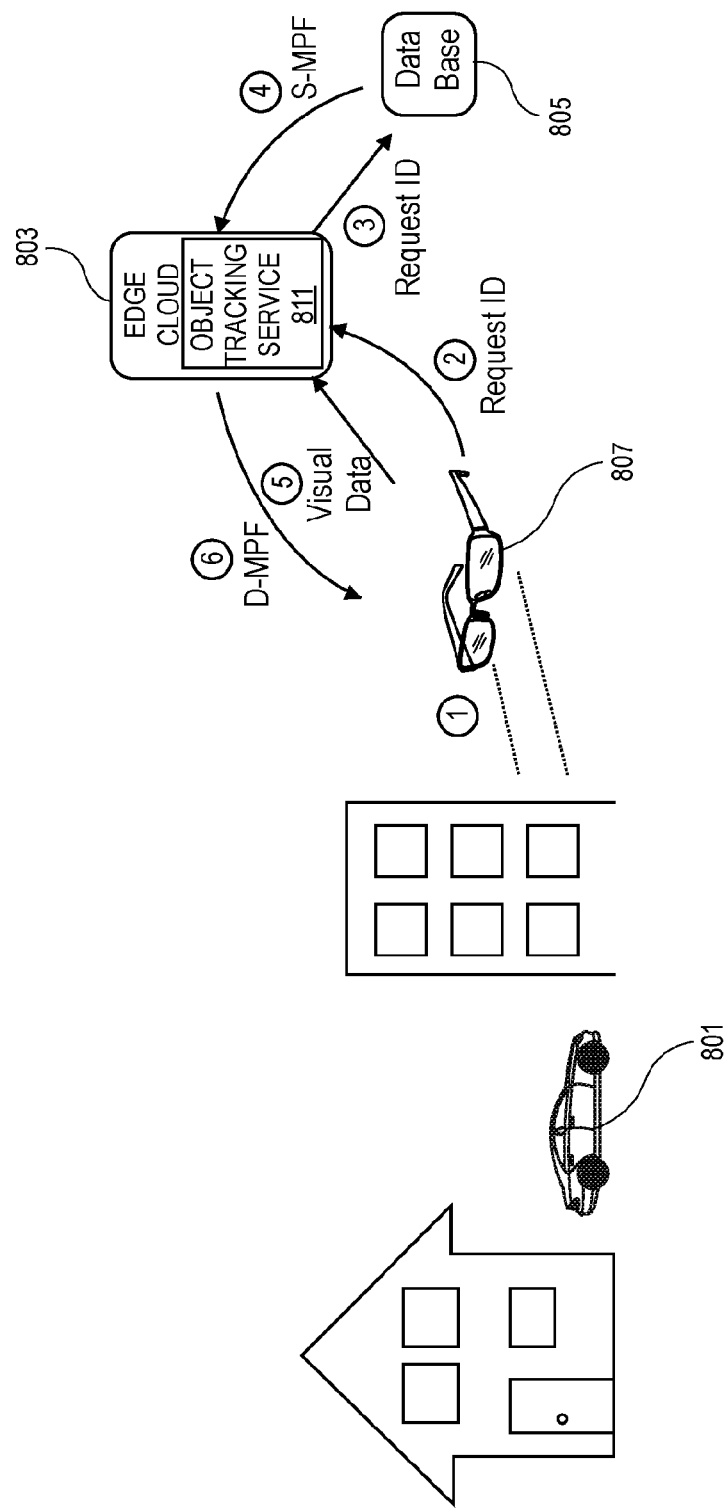
FIG. 8 is a diagram of another embodiment of the architecture of the edgecloud based XR overlay service.

FIG. 8 is a diagram of another embodiment of the architecture of the edgecloud based XR overlay service. In some embodiments, one or more communications between the XR user device 807 and the edgecloud 803 and/or the object tracking service 811 may be transmitted via one or more base stations. In this example, the XR application and XR user device 807 provide dynamic information that can be utilized in combination with a D-MPF. In a first stage, the XR user device 807 gathers real time dynamic data such as the location and placement of vehicles and structures. In this example, the object 801 and surrounding environment is captured by sensors (e.g., cameras) of the XR user device 807 and stored as visual data. In the second stage, the dynamic data is appended to, or transmitted along with, a RequestID and uploaded into the edgecloud 803. The XR application and XR user device 807 can communicate with the XR overlay services, object tracking service 811, or application specific services using any communication protocol or mechanism. The dynamic data can be sent using the same methods and protocols as the RequestID or by using other communication protocols or mechanisms. In a third stage, the RequestID is forwarded to a database 805 (e.g., by the object tracking service 811) to access the relevant static motion probability field (S-MPF) stored within the database 805. In a fourth stage, the S-MPF is returned to the object tracking service 811 at the edgecloud 803, where it is paired with the dynamic data (e.g., the real time visual data shared by the XR user device 807) for processing in the edgecloud 803. In a fifth stage, the dynamic data can be combined with the S-MPF using any process or algorithm for integrating the S-MPF into a D-MPF. In the sixth stage, the resulting D-MPF is returned by the object tracking service 811 to the XR user device 807.

Any process or algorithm can be used to estimate a static motion probability field (S-MPF). Depending on the type of sensors and the type of environments, different probabilistic state estimation methods could be used. In the below example process, a sufficiently general process is described that can be used to derive a static motion probability field. In a first step of the S-MPF estimation process, the process estimates the pose of the XR user device 807 by the (roughly known, with a positive margin of error introduced) next frame. This could be done based on odometry data of the XR user device 807, by movement prediction, and state estimation methods. Any pose estimation algorithms, movement models and movement constraints can be used.

In a second step of the S-MPF estimation process, the process estimates the movement of the tracked object in question by the (roughly known, with a positive margin of error introduced) next frame. The processes can use the estimation as the position of the XR user device 807 and can take into account other feature values as provided by sensors or other data collected by the XR user device 807. The motion model of objects will depend on the type of trajectories, the motion constraints, and similar considerations. In a third step of the S-MPF process, for objects with more deterministic motion models (e.g., ballistic trajectories), the movement estimate is less complex, and the process can proceed to step four. For objects with non-deterministic motion models, following an order of a movement preference map, the process checks a reasonable number of different possible directions as described in the substeps of this step. "Reasonable" in the above step is dependent upon the object, scene, and other factors. In typical cases, the preference is to either continue the present motion or follow an already predetermined path such as seeking to reach an objective with distance integrated over the proximity allowance map to provide a score. At each substep, the process: checks the maximum speed, limited by known parameters (e.g., braking power, acceleration power, coefficient of rolling friction, and similar parameters), at which the object will not violate proximity constraints as encoded by negative proximity allowance (e.g., minimum safe distance between the object and cars, drones, pedestrians, and similar considerations); if a proximity violation is inevitable, a negative score is provided, and zero is entered for all positive allowance values, wherein the magnitude of the negative score may represent the enormity of the violation, if known.

In a fourth step of the S-MPF estimation process, the process calculates the positional difference that will be created by the movement of the object in question (i.e., as determined in the second step) and the movement of the XR user device (i.e., as determined in the first step). In a fifth step, the process outputs the S-MPF in the form of a vector field of penalty or reward scores for movement based on known parameters and stores it in the edgecloud 803 or database 805, such that it can be retrieved upon request from XR user devices.

Similarly, any algorithm or process can be used to estimate a D-MPF. The difference between D-MPFs and S-MPFs is that in the D-MPF, the ability to integrate real time information, such as current position of other objects, is included in the process. The resulting D-MPF is used in real-time to improve overlay positioning. In the D-MPF estimation process below, the process is generalized and can be used to derive a D-MPF.

In a first step of the D-MPF estimation process, the process estimates the pose of the XR user device 807 by the (roughly known, with a positive margin of error introduced) next frame. This can be done based on odometry data of the XR user device 807, by movement prediction, and state estimation methods. Any pose estimation algorithms or processes, movement models and movement constraints can be used in the pose estimation. In a second step of the D-MPF estimation, the process estimates the movement of the tracked object in question by the (roughly known, with a positive margin of error introduced) next frame. The processes can use the estimation as the position of the XR user device 807 and can take into account other feature values as provided by sensors or other data collected by the XR user device 807. The motion model of objects will depend on the type of trajectories, the motion constraints, and similar considerations. In a third step of the D-MPF estimation process, the process uses the current and prior visual input, and updates a proximity allowance field. This can be modeled as a vector field of penalty or reward scores for movement.

In a fourth step of the D-MPF estimation process, for objects with more deterministic motion models (e.g., ballistic trajectories), the movement estimate is less complex, and the process can proceed to step five of the D-MPF process. For objects with non-deterministic motion models, following an order of a movement preference map, the process checks a reasonable number of different possible directions as described in the substeps of this step. The substeps take into account that the preference is to either continue the present motion or follow an already predetermined path, such as seeking to reach an objective, with distance integrated over the proximality allowance map to provide a score. In each substep of the fourth step, the process checks the maximum speed, limited by known parameters (e.g., braking power, acceleration power, coefficient of rolling friction, or similar parameters), at which the object will not violate proximity constraints as encoded by negative proximity allowance (e.g., minimum safe distance between the object and cars, drones, pedestrians, and similar considerations). In a further substep, if proximity violation is inevitable, a negative score is provided, and zero is entered for all positive allowance values, wherein the magnitude of the negative score may represent the enormity of the violation, if known.

In a fifth step of the D-MPF estimation process, the process calculates the positional difference that will be created by the movement of the object in question (i.e., as calculated in the second step) and the movement of the XR user device (i.e., as calculated in the first step). In the sixth step, the D-MPF estimation process outputs the D-MPF in the form of a vector field of penalty or reward scores for movement based on known and dynamic parameters, which is then available in the edgecloud 803 and/or database 805.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 9A:
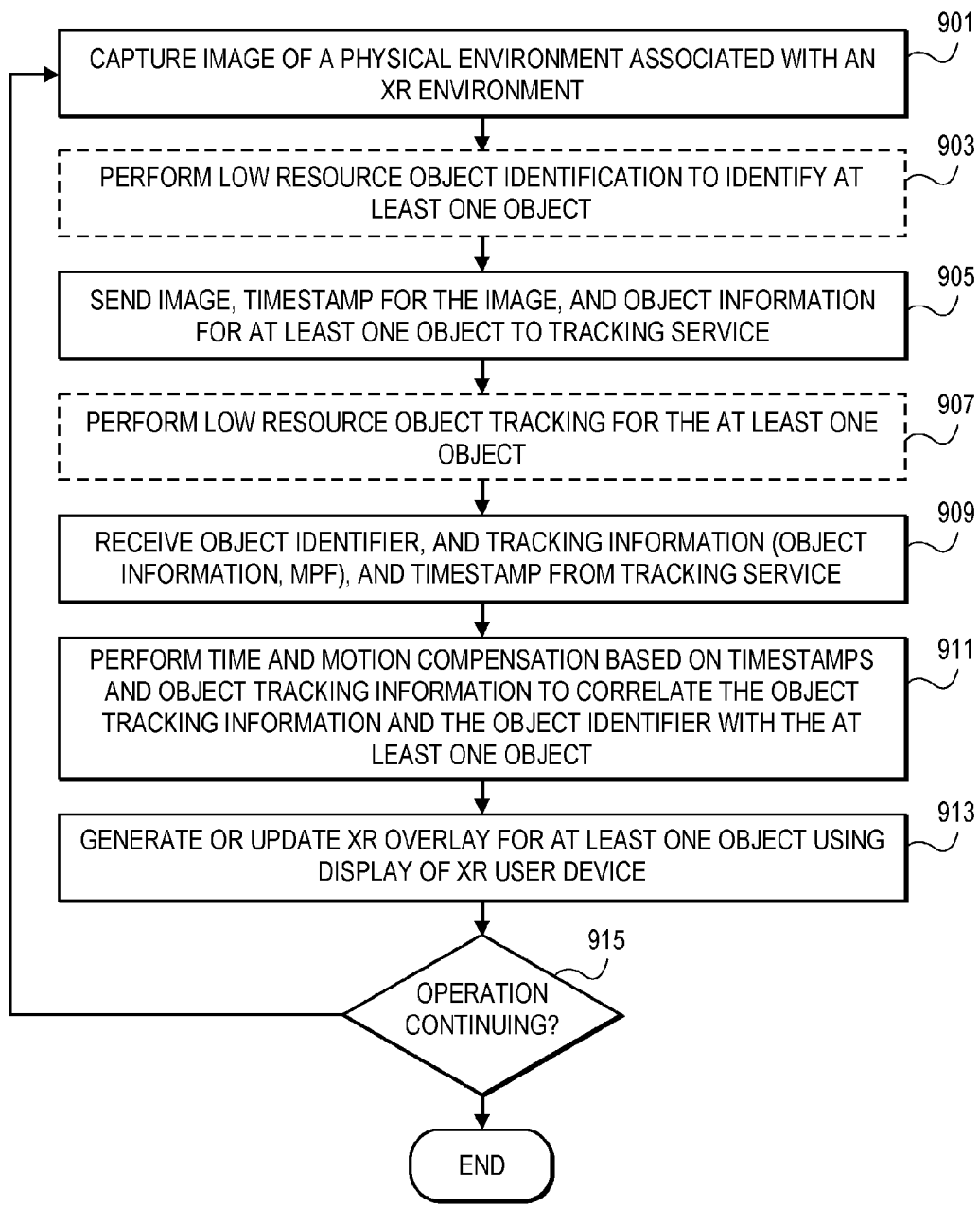
FIG. 9A is a flowchart of one embodiment of a process of object tracking at a XR user device or similar device.

FIG. 9A is a flowchart of one embodiment of a process of object tracking at a XR user device or similar device. The XR user device can implement single or multiple object tracking (MOT). These processes involve three main steps: detection, prediction and data association. In order to reduce the energy consumption at the XR user devices, a low complexity algorithm for object detection (e.g., MOT) is utilized. The process utilizes the processing power and resources of the edgecloud as well as the low latency of 5G or similar technologies' transmission to improve the tracking accuracy at the XR user devices.

The illustrated process is provided by way of example and not limitation. In this example, the process provides a MOT approach that performs low resource object detection at the XR user device. In some embodiments, the low resource object detection uses a background subtraction method and does object tracking and data association with a Kernelized Correlation Filter (KCF). The example process further includes computing class labels on the edgecloud and take other object related information into account, e.g., D-MPF, the pose, and the orientation of the XR user device, as well as the direction and speed of the movement of each object.

On the XR user device side, the outward facing cameras and similar imaging devices within the XR user device capture images of the physical environment (Block 901). Low resource object identification can then be performed on this set of images (Block 903). A 'set,' as used herein refers to any positive whole number of items including one item. In the example embodiment, foreground objects are detected as blobs in the captured images without any classification (e.g., determination of class labels) and tracked.

At any time after the image capture, the image along with other information collected by the XR user device can be organized and sent to the object tracking service (Block 905), e.g., via a base station. The set of captured images (or any subset thereof), object information (e.g., the detected object information), XR user device sensor information (e.g., positional and orientation information), timestamps (e.g., a first timestamp) for this data, and similar information can be sent to the object tracking service at the edge cloud. The tracking can be done on a per object basis with a KCF tracker or similar low resource object tracking technique (Block 907). The separate tracking of object (tracklets) is recorded to compute the direction, velocity and acceleration for the movement of each object (Block 907). In addition, the image coordinate for the tracking is compensated by the pose and the orientation of the XR user device with respect to a virtual frame of reference.

For the captured image that is sent to the edgecloud, object detection is performed, for example, a high confidence object detection process, e.g., with a deep learning approach. At the edgecloud, the object tracking service can perform object identification that can generate object instance class identifiers or labels, which are utilized to determine an object identifier. Thereafter, the processed D-MPF, object identifier, positions, a timestamp (e.g., a second timestamp) and other object information (e.g., object instance class identifiers or labels) are sent back to and received at the XR user device (Block 909), e.g., via a base station. With the returned information, time and motion compensation is performed using the timestamps and object information to correlate the returned object tracking information and object identifier with at least one object tracked at the XR user device (Block 911). To associate object identifiers obtained from the edgecloud with the objects tracked in the XR user device, the pose and orientation of the XR user device, D-MPF, and the movement of each object are taken into account to compensate the movement of the XR user device and the round-trip delay (latencies) between the XR user device and the edgecloud (e.g., the object tracking service in the XR overlay services provided by the edgecloud).

Once the object tracking information has been compensated for time and motion of the objects, then an XR application of the XR user device can generate or update the XR overlay for display via the XR user device (Block 913). The XR user device can have any type or number of displays including projection, liquid crystal display (LCD) panels, or similar mechanisms for displaying images to a user. The XR overlay is displayed in a position selected based on the predicted position of the object as determined by the object tracking service based on the D-MPF and adjustments for latency between the XR user device and the edgecloud. The process can continue (Block 915) by iterating one or more times, starting with the capture of another image (Block 901).

In another embodiment, the XR user device can perform a less accurate initial object detection to start the tracking instead of using the background subtraction method, which is then confirmed or corrected by the result of the more accurate object detection performed by the edge cloud. In further embodiments, because the object detection for high resolution images is very computationally demanding, the object detection processes at the edgecloud can also employ a method to reduce the processing complexity.

Figure 9B:
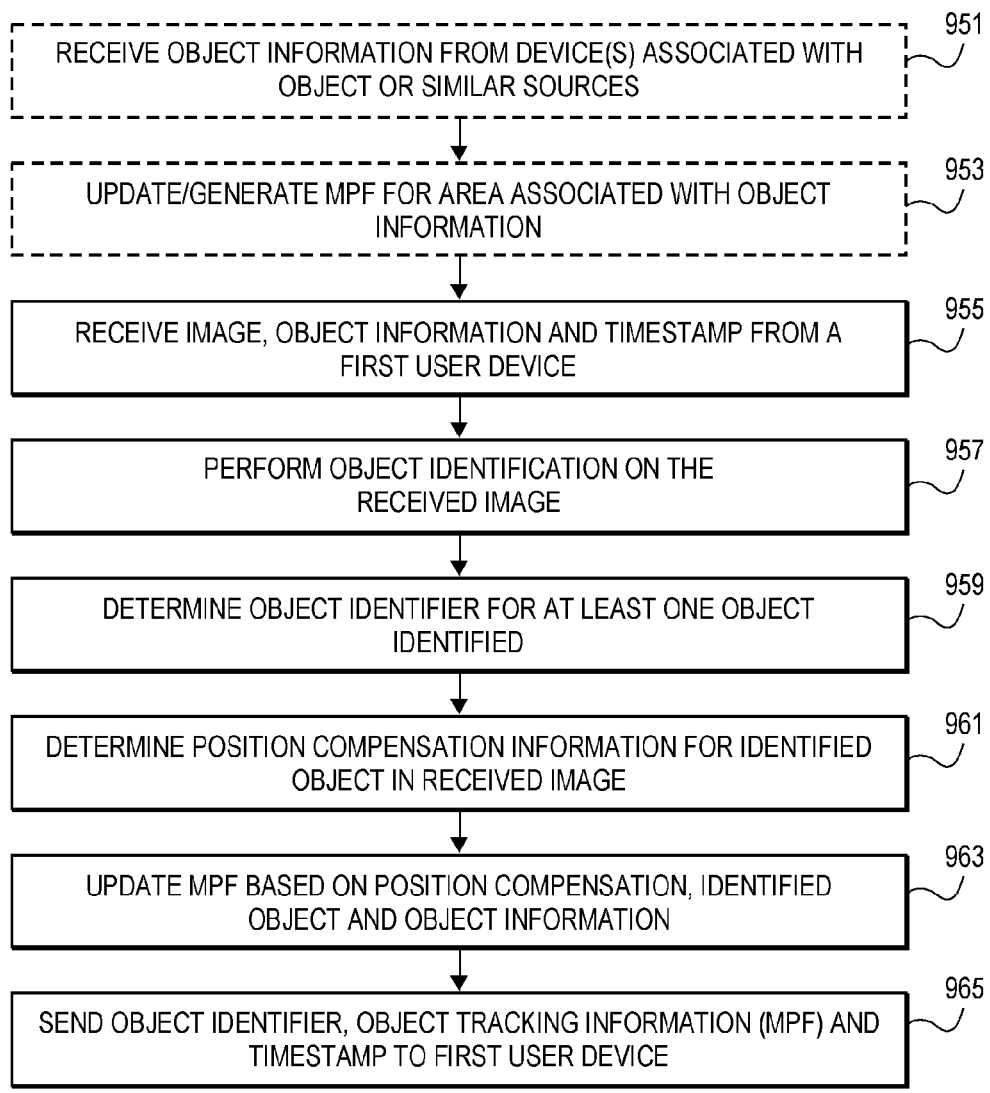
FIG. 9B is a flowchart of one embodiment of a process of object tracking at a set of one or more electronic devices at the edgecloud.

FIG. 9B is a flowchart of one embodiment of a process of object tracking at a set of one or more electronic devices at the edgecloud. The edgecloud can support and/or implement a single or multiple object tracking scheme. As mentioned above, to reduce the energy consumption at the XR user devices, a low complexity algorithm for object detection (e.g., MOT) is utilized at the XR user devices. The edgecloud provides the processing power and resources to improve the object tracking accuracy leveraging the speed and low latency of 5G NR and similar technologies.

The illustrated process is provided by way of example and not limitation. In this example, the process involves a MOT approach that performs low resource usage object detection at the XR user device and higher resource usage object detection at the edgecloud. At the edgecloud, the object tracking services operate responsive to receiving updated object information from devices associated with the objects, XR user devices, or similar electronic devices that can provide object information or that utilize the object information. In the example embodiment, the edgecloud initially receives, e.g., via a base station, object information from a device associated with the object or similar source (Block 951). The received object information can include positional information (e.g., position information, orientation, speed, and similar information), characteristics of the object such as state information, a timestamp of when the object information was sent to the edgecloud and similar information. The object tracking services at the edgecloud can use the received object information to update or generate a MPF (e.g., a D-MPF) for the area in the vicinity of the object as indicated by the received object information (Block 953). The received object information can also include the object identifier (ObjectID), which uniquely identifies the object in the XR environment. The receipt and processing of object information from devices associated with an object or similar electronic devices that collect object information is asynchronous with the receipt and processing of images and object information from XR user devices that are offloading the object detection to the edgecloud. The illustrated flow is an example case and does not indicate that these functions have specific sequencing.

The object tracking service can receive, e.g., via a base station, images, object information, timestamps (e.g., a first timestamp) and similar information from XR user devices (Block 955). This information can be received at any time and initiates a process for the edgecloud to process this information to provide improved object detection and tracking, which supports optimized XR overlays at the XR user device. The received information can include images captured of the physical environment by the XR user device. In addition, the XR user device can provide other object information including identified objects, XR user device positional information, timestamps for the collection or sending of this information, and similar information.

High resource object identification is then performed on this set of images (Block 957). Any object identification process, mechanism, or algorithm can be utilized that provides a higher confidence level than the object identification process used at the XR user device. The object identification process can identify any number of objects in the images. For example, high confidence object identification can be performed using machine-learning models including neural nets, deep learning, and similar technology. The object identification can include object instance class identification or labeling. The identified objects can then be matched with object identifiers based on classification of the type of the object (e.g., class labeling and or class identifiers), the position of the object, correlation with object information tracked at the edge cloud, and similar operations to match the identified objects with an object identifier (ObjectID) and related object information that is collected by the object tracking service at the edgecloud (Block 959). In some embodiments, the object tracking service can determine position compensation information for the identified objects in the received images. The position compensation can be determined by determining the amount of time that has passed and the timestamps associated with the objects (Block 961). The positional information of the objects can be analyzed to extrapolate a predicted position at a current time or future time (e.g., the time that it is anticipated that the XR overlay is to be rendered at the XR device). For example, if a tracked object is traveling in a given direction at 10 km/s, then it can be determined that it has moved forward 20 km if two seconds have elapsed or are anticipated to elapse before the display of the XR overlay.

The MPF associated with the detected object can be updated based on the position compensation, identified object, and object information (Block 963). The updated MPF or a portion thereof associated with the vicinity of the XR user device can then be sent, e.g., via a base station, to the XR user device along with any additional object information, object identifier, object class identifiers or labels, timestamps (e.g., a second timestamp), and similar data (Block 965). The information sent to the XR user device can then be used to update the object tracking at the XR user device.

With the returned information, time and motion compensation is performed using the timestamps and object information to correlate the returned object tracking information and object identifier with at least one object tracked at the XR user device. To associate object class identifiers or labels or object identifiers obtained from the edgecloud with the objects tracked in the XR user device, the pose and orientation of the XR user device, D-MPF, and the movement of each object are taken into account to compensate the movement of the XR user device and the round-trip delay (latencies) between the XR user device and the edgecloud (e.g., the object tracking service in the XR overlay services provided by the edgecloud).

Once the object tracking information has been compensated for time and motion of the objects, then an XR application of the XR user device can generate or update the XR overlay for display via the XR user device. The XR user device can have any type or number of displays including projection, liquid crystal display (LCD) panels, or similar mechanisms for displaying images to a user. The XR overlay is displayed in a position selected based on the predicted position of the object as determined by the object tracking service based on the D-MPF and adjustments for latency between the XR user device and the edgecloud.

Figure 10:
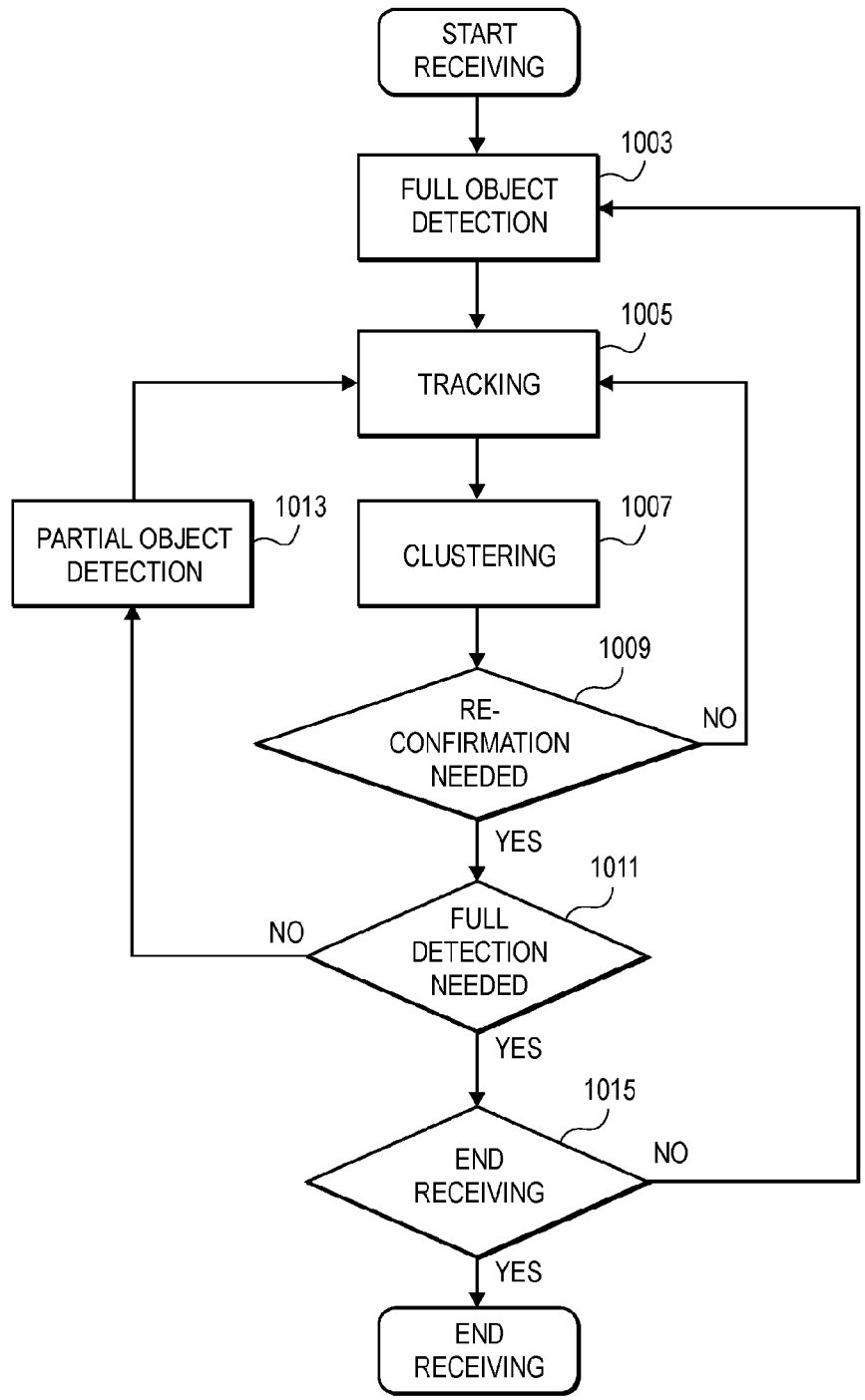
FIG. 10 is a flowchart that illustrates a low energy object detection technique performed by the XR user device.

FIG. 10 is a flowchart that illustrates a low energy object detection technique performed by the XR user device. The cameras, sensors, and/or image capturing devices of the XR user device can capture a set of images at any interval or frequency. These images are provided to the low energy object detection process for analysis. In this example, a full object detection process performs an analysis of the full image or a set of images (Block 1003). The analysis can be in the full (e.g., high) resolution of the images (i.e., using the resolution of the images as they are captured) to be able to identify relatively smaller objects (or objects that are further away). Any algorithm can be used for object detection. As a result of the analysis, one or more objects are identified and designated for tracking (Block 1005).

These tracked objects are then clustered into a set of bounding boxes according to a clustering algorithm, e.g., by using a K-mean clustering algorithm based on the position of the objects (Block 1007). The value of K can be grown from one to a predefined number. This is to minimize the number of detections and the area of each cluster. Any clustering algorithm can be utilized with this process. Since eventually the object detection will be run on each cluster in the reconfirmation process, using a bigger cluster than the input of the object detector reduces the detection accuracy. For each object that is defined, very resource efficient tracking can be performed for every new frame of the camera, sensor, and/or image capturing device received and processed, without having to use a more complex neural network-based object detection.

In one embodiment, the object tracking can utilize the KCF using a Histogram of Oriented Gradient (HOG) computed from the image or similar technique to identify and track the tracked objects in each frame. This combination of processes has far lower computational needs and memory usage than that of full object detection.

After an interval or at a certain frequency, it is determined whether a reconfirmation of the object detection (OD) on the tracked objects is needed (Block 1009). Such a reconfirmation is less complex than a full OD of the full-resolution image. The frequency or use of reconfirmation can be configured and checked at the defined interval or frequency. If the reconfirmation is to be done, but whether a full object detection is needed is determined (Block 1011) as no, then the partial object detection process is executed (Block 1013). The outcome of the OD-reconfirmation of a cluster leads to an improvement of the object detection accuracy. Tracking of the reconfirmed object can then proceed (Block 1005) after partial object detection. Similarly, the process can be configured to perform a full object detection at certain intervals, frequency, or for certain objects. In this case, the process evaluates when a full object detection is to be performed (Block 1011), and whether frames are continuing to be received (Block 1015). If a full object detection is to be performed, and additional frames are received, then the full object detection analysis is performed (Block 1003). If frames are no longer being received, then the process of tracking this specific object can be ended.

The application of the object tracking process and object tracking service is to improve the placement of XR overlays at the XR user device to improve user experiences in the XR environment. As the XR user devices receive information for objects (e.g., identified by an ObjectID), identify the target object, and start to track it on the XR user device, the XR application can overlay any type, combination, and amount of object information for the object (e.g., the ObjectID information) on the screen of the XR user device as an XR overlay. The XR application can continuously adjust the position of the XR overlay depending on how the XR user device and the tracked objects move in relation to each other. For every frame of camera, sensor, and/or image capture data, the object tracking service estimates the most likely position of the object. The XR application and object tracking service also utilizes positional information (e.g., positional information from IMU, GPS, compass, or similar sensor input) in order to know whether the XR user device is still (i.e., does not have a changed orientation relative to the object), indicating that the object is potentially moving whereas much of the background might be fixed, or whether the background is moving because the XR user device is moving. In addition, the other sensor information is useful to estimate the pose and the orientation of the XR user device and in particular the display (e.g., screen) of the XR user device, which can in turn be utilized to compensate its movement to help the tracking process.

It is possible that, because of changes in the scene or a long-period partial occlusion, that the object tracking service might lose track of an object. This can be mitigated by frequently sharing captured images with the edgecloud, performing a more accurate object detection at the edgecloud and receiving updates at the XR user device from the edgecloud that together with updated MPF can facilitate object tracking. The MPF data combined with tracking information (e.g., how fast was the object moving when the confidence in the tracking was still high) indicates where it is most likely that the object is currently for XR overlay positioning.

Figure 11A:
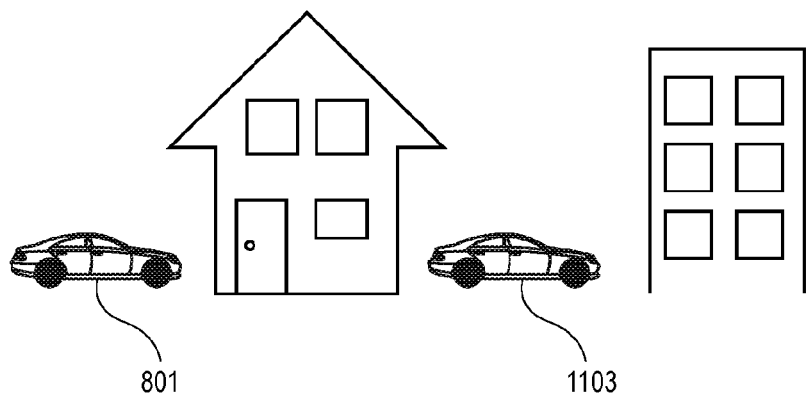
FIG. 11A is a diagram of one example of object occlusion where an object is initially visible to the XR user device.
Figure 11B:
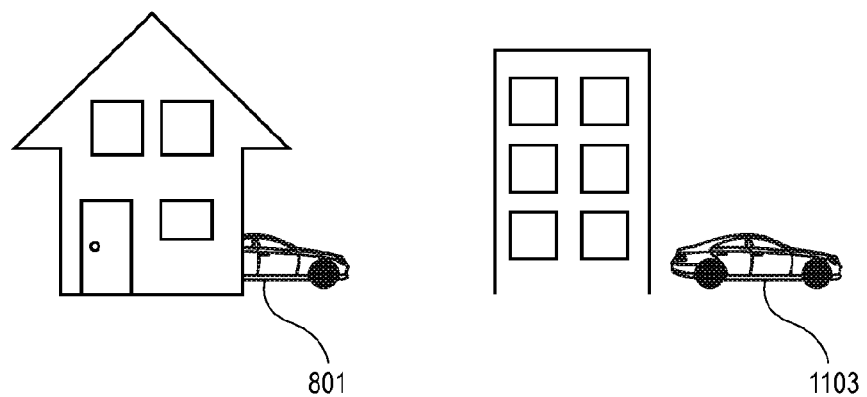
FIG. 11B is a diagram of one example of object occlusion where an object is partially or completely hidden to the XR user device.

FIGS. 11A and 11B are illustrations of a process for tracking occluded objects. Partly and temporarily occluded objects can be tracked by a technique referred to as a "logical leash." For an object already identified and being tracked, e.g., object 801, the object tracking service estimates how (e.g., speed, direction) the object is moving. When the XR user device receives updated information from the edgecloud about the object (e g., updated position, and/or updated S- and/or D-MPF) as well as the information on how old that information is (e.g., timestamps like $T_3$-$T_2$), the XR user device can correlate its tracking data with the confirmed object detection (whether the object tracking service is still tracking the correct object at the XR user device), position and motion data in order to confirm the position of the object on the display of the XR user device. In this manner, the XR user device can distinguish between the tracked object 801 and another similar object 1103 as shown in FIG. 11A. This tracking can even be maintained using this 'logical leash' technique when the tracked object 801 is partially or completely occluded such that the XR user device does not conflate the tracked object 801 with other similar objects such as object 1103.

Figure 12:
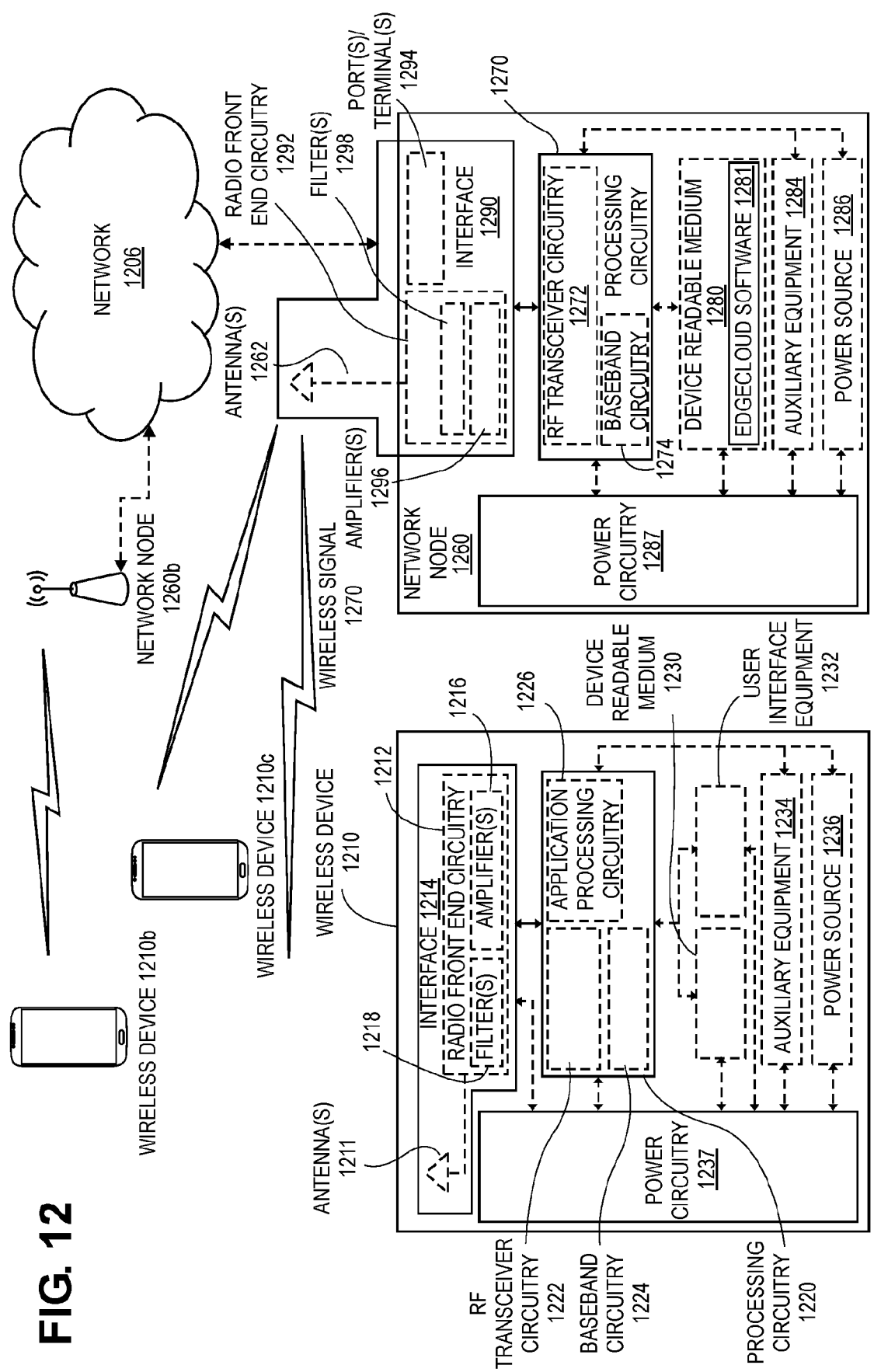
FIG. 12 is a diagram of one embodiment of a wireless network for supporting XR overlay services.

FIG. 12 is a diagram of one embodiment of a wireless network in accordance with some embodiments to provide Object tracking services. Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 1206, network nodes 1260 and 1260*b*, and WDs 1210, 1210*b*, and 1210*c*. In practice, a wireless network may further include any additional elements suitable to support communication between wireless devices or between a wireless device and another communication device, such as a landline telephone, a service provider, or any other network node or end device. Of the illustrated components, network node 1260 and wireless device (WD) 1210 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network, or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, 7-Wave and/or ZigBee standards.

Network 1206 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1260 and WD 1210 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 12, network node 1260 includes processing circuitry 1270, device readable medium 1280, interface 1290, auxiliary equipment 1284, power source 1286, power circuitry 1287, and antenna 1262. Although network node 1260 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of network node 1260 are depicted as single boxes located within a larger box, or nested within multiple boxes, in practice, a network node may comprise multiple different physical components that make up a single illustrated component (e.g., device readable medium 1280 may comprise multiple separate hard drives as well as multiple RAM modules).

Similarly, network node 1260 may be composed of multiple physically separate components (e.g., a NodeB component and an RNC component, or a BTS component and a BSC component, etc.), which may each have their own respective components. In certain scenarios in which network node 1260 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1260 may be configured to support multiple radio access technologies (RATs). In such embodiments, some components may be duplicated (e.g., separate device readable medium 1280 for the different RATs) and some components may be reused (e.g., the same antenna 1262 may be shared by the RATs). Network node 1260 may also include multiple sets of the various illustrated components for different wireless technologies integrated into network node 1260, such as, for example, GSM, WCDMA, LTE, NR, Wi-Fi, or Bluetooth wireless technologies. These wireless technologies may be integrated into the same or different chip or set of chips and other components within network node 1260.

Processing circuitry 1270 is configured to perform any determining, calculating, or similar operations (e.g., certain obtaining operations) described herein as being provided by a network node. These operations performed by processing circuitry 1270 may include processing information obtained by processing circuitry 1270 by, for example, converting the obtained information into other information, comparing the obtained information or converted information to information stored in the network node, and/or performing one or more operations based on the obtained information or converted information, and as a result of said processing making a determination.

Processing circuitry 1270 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1260 components, such as device readable medium 1280, network node 1260 functionality. For example, processing circuitry 1270 may execute instructions stored in device readable medium 1280 or in memory within processing circuitry 1270. Such functionality may include providing any of the various wireless features, functions, or benefits discussed herein. In some embodiments, processing circuitry 1270 may include a system on a chip (SOC).

In some embodiments, processing circuitry 1270 may include one or more of radio frequency (RF) transceiver circuitry 1272 and baseband processing circuitry 1274. In some embodiments, radio frequency (RF) transceiver circuitry 1272 and baseband processing circuitry 1274 may be on separate chips (or sets of chips), boards, or units, such as radio units and digital units. In alternative embodiments, part, or all of RF transceiver circuitry 1272 and baseband processing circuitry 1274 may be on the same chip or set of chips, boards, or units.

In certain embodiments, some or all of the functionality described herein as being provided by a network node, base station, eNB or other such network device may be performed by processing circuitry 1270 executing instructions stored on device readable medium 1280 or memory within processing circuitry 1270. In alternative embodiments, some or all of the functionality may be provided by processing circuitry 1270 without executing instructions stored on a separate or discrete device readable medium, such as in a hard-wired manner. In any of those embodiments, whether executing instructions stored on a device readable storage medium or not, processing circuitry 1270 can be configured to perform the described functionality. The benefits provided by such functionality are not limited to processing circuitry 1270 alone or to other components of network node 1260 but are enjoyed by network node 1260 as a whole, and/or by end users and the wireless network generally.

Device readable medium 1280 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1270. Device readable medium 1280 may store any suitable instructions, data or information, including a computer program, software, an application including one or more of logic, rules, code, tables, etc. and/or other instructions capable of being executed by processing circuitry 1270 and, utilized by network node 1260. Device readable medium 1280 may be used to store any calculations made by processing circuitry 1270 and/or any data received via interface 1290. In some embodiments, processing circuitry 1270 and device readable medium 1280 may be considered to be integrated.

The device readable medium 1280 can include code implementing edgecloud software 1281 and related functions as described herein. The edgecloud software 1281 can be executed by the processing circuitry 1270. The edgecloud software 1281 can have any organization, range of functions, and variety of components in support of the edgecloud functions as described herein. In this embodiment, the edgecloud is shown as software or a subsystem at the network node 1260 (e.g., at a basestation). The edgecloud software 1281 can be distributed over any number of network nodes serving many user devices and services, the edgecloud can also be implemented in central cloud systems or other similar central compute systems and any combinations thereof. The functions of the edgecloud can serve any number and variety of different wireless devices 1210, and similar devices. The edgecloud software 1281 can be utilized and executed in other contexts such as in combination with the object tracking services as described herein with relation to FIGS. 15A-16.

Interface 1290 is used in the wired or wireless communication of signaling and/or data between network node 1260, network 1206, and/or WDs 1210. As illustrated, interface 1290 comprises port(s)/terminal(s) 1294 to send and receive data, for example to and from network 1206 over a wired connection. Interface 1290 also includes radio front end circuitry 1292 that may be coupled to, or in certain embodiments a part of, antenna 1262. Radio front end circuitry 1292 comprises filters 1298 and amplifiers 1296. Radio front end circuitry 1292 may be connected to antenna 1262 and processing circuitry 1270. Radio front end circuitry may be configured to condition signals communicated between antenna 1262 and processing circuitry 1270. Radio front end circuitry 1292 may receive digital data that is to be sent out to other network nodes or WDs via a wireless connection. Radio front end circuitry 1292 may convert the digital data into a radio signal having the appropriate channel and bandwidth parameters using a combination of filters 1298 and/or amplifiers 1296. The radio signal may then be transmitted via antenna 1262. Similarly, when receiving data, antenna 1262 may collect radio signals which are then converted into digital data by radio front end circuitry 1292. The digital data may be passed to processing circuitry 1270. In other embodiments, the interface may comprise different components and/or different combinations of components.

In certain alternative embodiments, network node 1260 may not include separate radio front end circuitry 1292, instead, processing circuitry 1270 may comprise radio front end circuitry and may be connected to antenna 1262 without separate radio front end circuitry 1292. Similarly, in some embodiments, all, or some of RF transceiver circuitry 1272 may be considered a part of interface 1290. In still other embodiments, interface 1290 may include one or more ports or terminals 1294, radio front end circuitry 1292, and RF transceiver circuitry 1272, as part of a radio unit (not shown), and interface 1290 may communicate with baseband processing circuitry 1274, which is part of a digital unit (not shown).

Antenna 1262 may include one or more antennas, or antenna arrays, configured to send and/or receive wireless signals. Antenna 1262 may be coupled to radio front end circuitry 1290 and may be any type of antenna capable of transmitting and receiving data and/or signals wirelessly. In some embodiments, antenna 1262 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1262 may be separate from network node 1260 and may be connectable to network node 1260 through an interface or port.

Antenna 1262, interface 1290, and/or processing circuitry 1270 may be configured to perform any receiving operations and/or certain obtaining operations described herein as being performed by a network node. Any information, data and/or signals may be received from a wireless device, another network node, and/or any other network equipment. Similarly, antenna 1262, interface 1290, and/or processing circuitry 1270 may be configured to perform any transmitting operations described herein as being performed by a network node. Any information, data and/or signals may be transmitted to a wireless device, another network node, and/or any other network equipment.

Power circuitry 1287 may comprise, or be coupled to, power management circuitry and is configured to supply the components of network node 1260 with power for performing the functionality described herein. Power circuitry 1287 may receive power from power source 1286. Power source 1286 and/or power circuitry 1287 may be configured to provide power to the various components of network node 1260 in a form suitable for the respective components (e.g., at a voltage and current level needed for each respective component). Power source 1286 may either be included in, or external to, power circuitry 1287 and/or network node 1260. For example, network node 1260 may be connectable to an external power source (e.g., an electricity outlet) via an input circuitry or interface such as an electrical cable, whereby the external power source supplies power to power circuitry 1287. As a further example, power source 1286 may comprise a source of power in the form of a battery or battery pack which is connected to, or integrated in, power circuitry 1287. The battery may provide backup power should the external power source fail. Other types of power sources, such as photovoltaic devices, may also be used.

Alternative embodiments of network node 1260 may include additional components beyond those shown in FIG. 12 that may be responsible for providing certain aspects of the network node's functionality, including any of the functionality described herein and/or any functionality necessary to support the subject matter described herein. For example, network node 1260 may include user interface equipment to allow input of information into network node 1260 and to allow output of information from network node 1260. This may allow a user to perform diagnostic, maintenance, repair, and other administrative functions for network node 1260.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1210 includes antenna 1211, interface 1214, processing circuitry 1220, device readable medium 1230, user interface equipment 1232, auxiliary equipment 1234, power source 1236 and power circuitry 1237. WD 1210 may include multiple sets of one or more of the illustrated components for different wireless technologies supported by WD 1210, such as, for example, GSM, WCDMA, LTE, NR, Wi-Fi, WiMAX, or Bluetooth wireless technologies, just to mention a few. These wireless technologies may be integrated into the same or different chips or set of chips as other components within WD 1210.

Antenna 1211 may include one or more antennas or antenna arrays, configured to send, and/or receive wireless signals, and is connected to interface 1214. In certain alternative embodiments, antenna 1211 may be separate from WD 1210 and be connectable to WD 1210 through an interface or port. Antenna 1211, interface 1214, and/or processing circuitry 1220 may be configured to perform any receiving or transmitting operations described herein as being performed by a WD. Any information, data and/or signals may be received from a network node and/or another WD. In some embodiments, radio front end circuitry and/or antenna 1211 may be considered an interface.

As illustrated, interface 1214 comprises radio front end circuitry 1212 and antenna 1211. Radio front end circuitry 1212 comprise one or more filters 1218 and amplifiers 1216. Radio front end circuitry 1214 is connected to antenna 1211 and processing circuitry 1220, and is configured to condition signals communicated between antenna 1211 and processing circuitry 1220. Radio front end circuitry 1212 may be coupled to or a part of antenna 1211. In some embodiments, WD 1210 may not include separate radio front end circuitry 1212, rather, processing circuitry 1220 may comprise radio front end circuitry and may be connected to antenna 1211. Similarly, in some embodiments, some, or all of RF transceiver circuitry 1222 may be considered a part of interface 1214. Radio front end circuitry 1212 may receive digital data that is to be sent out to other network nodes or WDs via a wireless connection. Radio front end circuitry 1212 may convert the digital data into a radio signal having the appropriate channel and bandwidth parameters using a combination of filters 1218 and/or amplifiers 1216. The radio signal may then be transmitted via antenna 1211. Similarly, when receiving data, antenna 1211 may collect radio signals which are then converted into digital data by radio front end circuitry 1212. The digital data may be passed to processing circuitry 1220. In other embodiments, the interface may comprise different components and/or different combinations of components.

Processing circuitry 1220 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1210 components, such as device readable medium 1230, WD 1210 functionality. Such functionality may include providing any of the various wireless features or benefits discussed herein. For example, processing circuitry 1220 may execute instructions stored in device readable medium 1230 or in memory within processing circuitry 1220 to provide the functionality disclosed herein.

As illustrated, processing circuitry 1220 includes one or more of RF transceiver circuitry 1222, baseband processing circuitry 1224, and application processing circuitry 1226. In other embodiments, the processing circuitry may comprise different components and/or different combinations of components. In certain embodiments processing circuitry 1220 of WD 1210 may comprise a SOC. In some embodiments, RF transceiver circuitry 1222, baseband processing circuitry 1224, and application processing circuitry 1226 may be on separate chips or sets of chips. In alternative embodiments, part, or all of baseband processing circuitry 1224 and application processing circuitry 1226 may be combined into one chip or set of chips, and RF transceiver circuitry 1222 may be on a separate chip or set of chips. In still alternative embodiments, part, or all of RF transceiver circuitry 1222 and baseband processing circuitry 1224 may be on the same chip or set of chips, and application processing circuitry 1226 may be on a separate chip or set of chips. In yet other alternative embodiments, part, or all of RF transceiver circuitry 1222, baseband processing circuitry 1224, and application processing circuitry 1226 may be combined in the same chip or set of chips. In some embodiments, RF transceiver circuitry 1222 may be a part of interface 1214. RF transceiver circuitry 1222 may condition RF signals for processing circuitry 1220.

In certain embodiments, some or all of the functionality described herein as being performed by a WD may be provided by processing circuitry 1220 executing instructions stored on device readable medium 1230, which in certain embodiments may be a computer-readable storage medium. In alternative embodiments, some or all of the functionality may be provided by processing circuitry 1220 without executing instructions stored on a separate or discrete device readable storage medium, such as in a hard-wired manner. In any of those particular embodiments, whether executing instructions stored on a device readable storage medium or not, processing circuitry 1220 can be configured to perform the described functionality. The benefits provided by such functionality are not limited to processing circuitry 1220 alone or to other components of WD 1210, but are enjoyed by WD 1210 as a whole, and/or by end users and the wireless network generally.

Processing circuitry 1220 may be configured to perform any determining, calculating, or similar operations (e.g., certain obtaining operations) described herein as being performed by a WD. These operations, as performed by processing circuitry 1220, may include processing information obtained by processing circuitry 1220 by, for example, converting the obtained information into other information, comparing the obtained information or converted information to information stored by WD 1210, and/or performing one or more operations based on the obtained information or converted information, and as a result of said processing making a determination.

Device readable medium 1230 may be operable to store a computer program, software, an application including one or more of logic, rules, code, tables, etc. and/or other instructions capable of being executed by processing circuitry 1220. Device readable medium 1230 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1220. In some embodiments, processing circuitry 1220 and device readable medium 1230 may be considered to be integrated.

User interface equipment 1232 may provide components that allow for a human user to interact with WD 1210. Such interaction may be of many forms, such as visual, audial, tactile, etc. User interface equipment 1232 may be operable to produce output to the user and to allow the user to provide input to WD 1210. The type of interaction may vary depending on the type of user interface equipment 1232 installed in WD 1210. For example, if WD 1210 is a smart phone, the interaction may be via a touch screen; if WD 1210 is a smart meter, the interaction may be through a screen that provides usage (e.g., the number of gallons used) or a speaker that provides an audible alert (e.g., if smoke is detected). User interface equipment 1232 may include input interfaces, devices and circuits, and output interfaces, devices, and circuits. User interface equipment 1232 is configured to allow input of information into WD 1210, and is connected to processing circuitry 1220 to allow processing circuitry 1220 to process the input information. User interface equipment 1232 may include, for example, a microphone, a proximity or other sensor, keys/buttons, a touch display, one or more cameras, a USB port, or other input circuitry. User interface equipment 1232 is also configured to allow output of information from WD 1210, and to allow processing circuitry 1220 to output information from WD 1210. User interface equipment 1232 may include, for example, a speaker, a display, vibrating circuitry, a USB port, a headphone interface, or other output circuitry. Using one or more input and output interfaces, devices, and circuits, of user interface equipment 1232, WD 1210 may communicate with end users and/or the wireless network, and allow them to benefit from the functionality described herein.

Auxiliary equipment 1234 is operable to provide more specific functionality which may not be generally performed by WDs. This may comprise specialized sensors for doing measurements for various purposes, interfaces for additional types of communication such as wired communications etc. The inclusion and type of components of auxiliary equipment 1234 may vary depending on the embodiment and/or scenario.

Power source 1236 may, in some embodiments, be in the form of a battery or battery pack. Other types of power sources, such as an external power source (e.g., an electricity outlet), photovoltaic devices or power cells, may also be used. WD 1210 may further comprise power circuitry 1237 for delivering power from power source 1236 to the various parts of WD 1210 which need power from power source 1236 to carry out any functionality described or indicated herein. Power circuitry 1237 may in certain embodiments comprise power management circuitry. Power circuitry 1237 may additionally or alternatively be operable to receive power from an external power source; in which case WD 1210 may be connectable to the external power source (such as an electricity outlet) via input circuitry or an interface such as an electrical power cable. Power circuitry 1237 may also in certain embodiments be operable to deliver power from an external power source to power source 1236. This may be, for example, for the charging of power source 1236. Power circuitry 1237 may perform any formatting, converting, or other modification to the power from power source 1236 to make the power suitable for the respective components of WD 1210 to which power is supplied.

Figure 13:
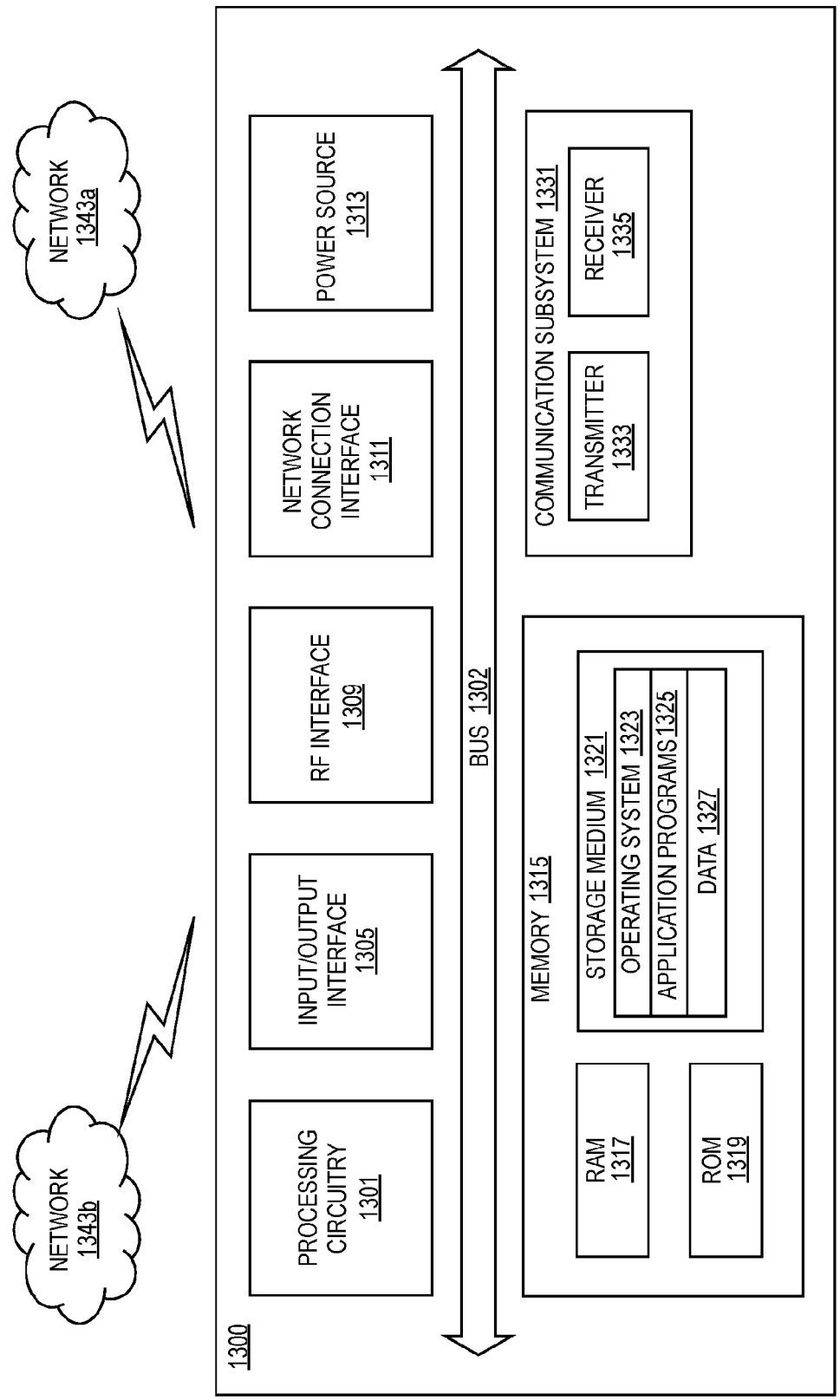
FIG. 13 is a diagram of one embodiment of user equipment for supporting XR overlay services.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 13200 may be any UE identified by the 3rd Generation Partnership Project (3GPP), including a NB-IoT UE, a machine type communication (MTC) UE, and/or an enhanced MTC (eMTC) UE. UE 1300, as illustrated in FIG. 13, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, UE 1300 includes processing circuitry 1301 that is operatively coupled to input/output interface 1305, radio frequency (RF) interface 1309, network connection interface 1311, memory 1315 including random access memory (RAM) 1317, read-only memory (ROM) 1319, and storage medium 1321 or the like, communication subsystem 1331, power source 1333, and/or any other component, or any combination thereof. Storage medium 1321 includes operating system 1323, application program 1325, and data 1327. In other embodiments, storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, processing circuitry 1301 may be configured to process computer instructions and data. Processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1301 may include two central processing units (CPUs). Data may be information in a form suitable for use by a computer.

In the depicted embodiment, input/output interface 1305 may be configured to provide a communication interface to an input device, output device, or input and output device UE 1300 may be configured to use an output device via input/output interface 1305. An output device may use the same type of interface port as an input device. For example, a USB port may be used to provide input to and output from UE 1300. The output device may be a speaker, a sound card, a video card, a display, a monitor, a printer, an actuator, an emitter, a smartcard, another output device, or any combination thereof. UE 1300 may be configured to use an input device via input/output interface 1305 to allow a user to capture information into UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, global positioning service sensor, and an optical sensor.

In FIG. 13, RF interface 1309 may be configured to provide a communication interface to RF components such as a transmitter, a receiver, and an antenna. Network connection interface 1311 may be configured to provide a communication interface to network 1343a. Network 1343a may encompass wired and/or wireless networks such as a local-area network (LAN), a wide-area network (WAN), a computer network, a wireless network, a telecommunications network, another like network or any combination thereof. For example, network 1343a may comprise a Wi-Fi network. Network connection interface 1311 may be configured to include a receiver and a transmitter interface used to communicate with one or more other devices over a communication network according to one or more communication protocols, such as Ethernet, TCP/IP, SONET, ATM, or the like. Network connection interface 1311 may implement receiver and transmitter functionality appropriate to the communication network links (e.g., optical, electrical, and the like). The transmitter and receiver functions may share circuit components, software, or firmware, or alternatively may be implemented separately.

RAM 1317 may be configured to interface via bus 1302 to processing circuitry 1301 to provide storage or caching of data or computer instructions during the execution of software programs such as the operating system, application programs, and device drivers. ROM 1319 may be configured to provide computer instructions or data to processing circuitry 1301. For example, ROM 1319 may be configured to store invariant low-level system code or data for basic system functions such as basic input and output (I/O), startup, or reception of keystrokes from a keyboard that are stored in a non-volatile memory. Storage medium 1321 may be configured to include memory such as RAM. ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1321 may be configured to include operating system 1323, application program 1325 such as a web browser application, a widget or gadget engine or another application, and data file 1327. Storage medium 1321 may store, for use by UE 1300, any of a variety of various operating systems or combinations of operating systems.

Storage medium 1321 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1321 may allow UE 1300 to access computer-executable instructions, application programs or the like, stored on transitory or non-transitory memory media, to off-load data, or to upload data. An article of manufacture, such as one utilizing a communication system may be tangibly embodied in storage medium 1321, which may comprise a device readable medium.

In FIG. 13, processing circuitry 1301 may be configured to communicate with network 1343b using communication subsystem 1331. Network 1343a and network 1343b may be the same network or networks or different network or networks. Communication subsystem 1331 may be configured to include one or more transceivers used to communicate with network 1343b. For example, communication subsystem 1331 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter 1333 and/or receiver 1335 to implement transmitter or receiver functionality, respectively, appropriate to the RAN links (e.g., frequency allocations and the like) Further, transmitter 1333 and receiver 1335 of each transceiver may share circuit components, software, or firmware, or alternatively may be implemented separately.

In the illustrated embodiment, the communication functions of communication subsystem 1331 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1331 may include cellular communication, Wi-Fi communication, Bluetooth communication, and GPS communication. Network 1343b may encompass wired and/or wireless networks such as a local-area network (LAN), a wide-area network (WAN), a computer network, a wireless network, a telecommunications network, another like network or any combination thereof. For example, network 1343b may be a cellular network, a Wi-Fi network, and/or a near-field network. Power source 1313 may be configured to provide alternating current (AC) or direct current (DC) power to components of UE 1300.

The features, benefits and/or functions described herein may be implemented in one of the components of UE 1300 or partitioned across multiple components of UE 1300. Further, the features, benefits, and/or functions described herein may be implemented in any combination of hardware, software, or firmware. In one example, communication subsystem 1331 may be configured to include any of the components described herein. Further, processing circuitry 1301 may be configured to communicate with any of such components over bus 1302. In another example, any of such components may be represented by program instructions stored in memory that when executed by processing circuitry 1301 perform the corresponding functions described herein. In another example, the functionality of any of such components may be partitioned between processing circuitry 1301 and communication subsystem 1331. In another example, the non-computationally intensive functions of any of such components may be implemented in software or firmware and the computationally intensive functions may be implemented in hardware.

Figure 14:
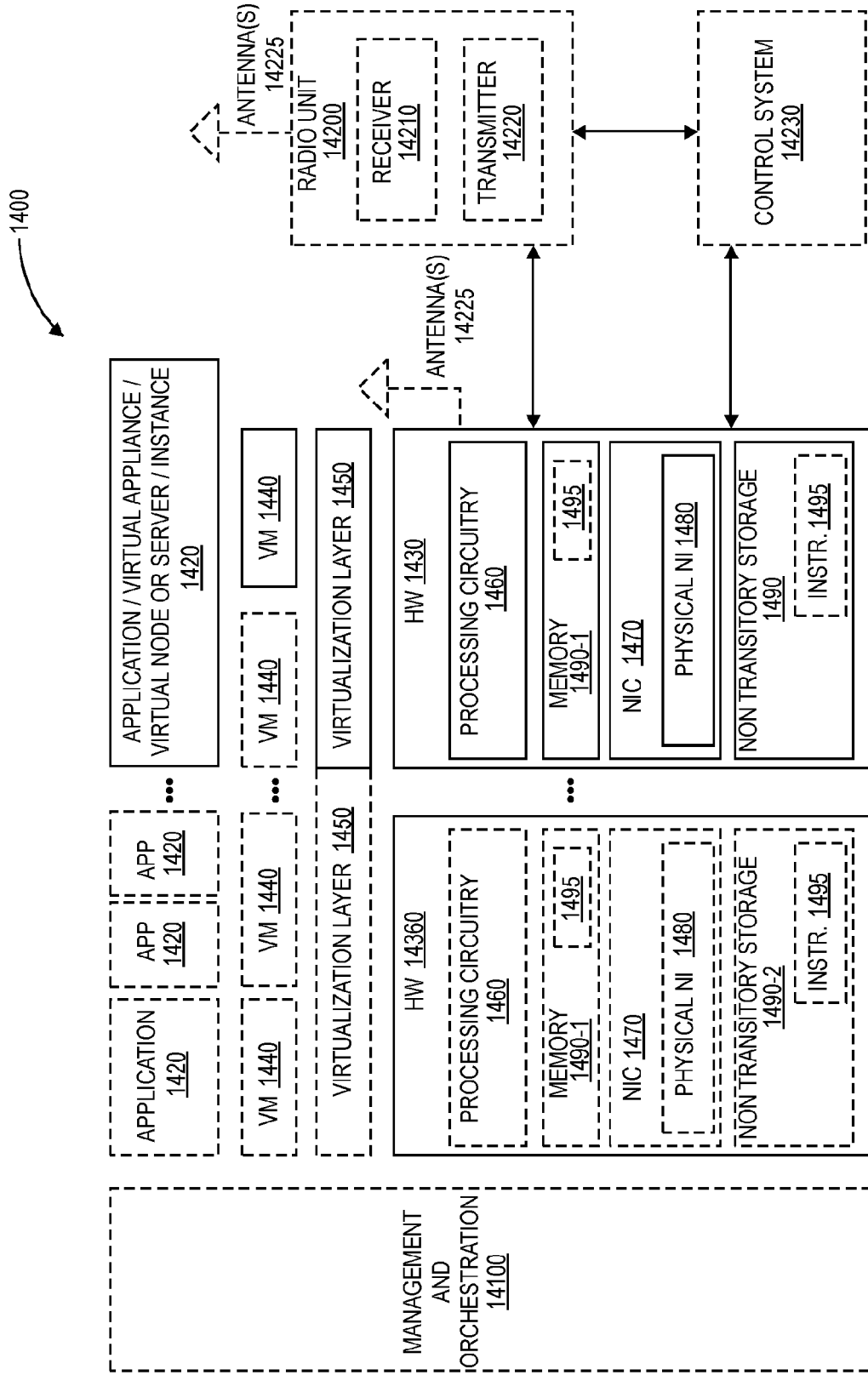
FIG. 14 is a diagram of one embodiment of a virtualization environment for supporting XR overlay services.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. Applications 1420 are run in virtualization environment 1400 which provides hardware 1430 comprising processing circuitry 1460 and memory 1490. Memory 1490 contains instructions 1495 executable by processing circuitry 1460 whereby application 1420 is operative to provide one or more of the features, benefits, and/or functions disclosed herein.

Virtualization environment 1400, comprises general-purpose or special-purpose network hardware devices 1430 comprising a set of one or more processors or processing circuitry 1460, which may be commercial off-the-shelf (COTS) processors, dedicated Application Specific Integrated Circuits (ASICs), or any other type of processing circuitry including digital or analog hardware components or special purpose processors. Each hardware device may comprise memory 1490-1 which may be non-persistent memory for temporarily storing instructions 1495 or software executed by processing circuitry 1460. Each hardware device may comprise one or more network interface controllers (NICs) 1470, also known as network interface cards, which include physical network interface 1480. Each hardware device may also include non-transitory, persistent, machine-readable storage media 1490-2 having stored therein software 1495 and/or instructions executable by processing circuitry 1460. Software 1495 may include any type of software including software for instantiating one or more virtualization layers 1450 (also referred to as hypervisors), software to execute virtual machines 1440 as well as software allowing it to execute functions, features and/or benefits described in relation with some embodiments described herein.

Virtual machines 1440, comprise virtual processing, virtual memory, virtual networking or interface and virtual storage, and may be run by a corresponding virtualization layer 1450 or hypervisor. Different embodiments of the instance of virtual appliance 1420 may be implemented on one or more of virtual machines 1440, and the implementations may be made in different ways.

During operation, processing circuitry 1460 executes software 1495 to instantiate the hypervisor or virtualization layer 1450, which may sometimes be referred to as a virtual machine monitor (VMM). Virtualization layer 1450 may present a virtual operating platform that appears like networking hardware to virtual machine 1440.

As shown in FIG. 14, hardware 1430 may be a standalone network node with generic or specific components. Hardware 1430 may comprise antenna 14225 and may implement some functions via virtualization. Alternatively, hardware 1430 may be part of a larger cluster of hardware (e.g., such as in a data center or customer premise equipment (CPE)) where many hardware nodes work together and are managed via management and orchestration (MANO) 14100, which, among others, oversees lifecycle management of applications 1420.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1440 may be a software implementation of a physical machine that runs programs as if they were executing on a physical, non-virtualized machine. Each of virtual machines 1440, and that part of hardware 1430 that executes that virtual machine, be it hardware dedicated to that virtual machine and/or hardware shared by that virtual machine with others of the virtual machines 1440, forms a separate virtual network elements (VNE).

Still in the context of NFV, Virtual Network Function (VNF) is responsible for handling specific network functions that run in one or more virtual machines 1440 on top of hardware networking infrastructure 1430 and corresponds to application 1420 in FIG. 14.

In some embodiments, one or more radio units 14200 that each include one or more transmitters 14220 and one or more receivers 14210 may be coupled to one or more antennas 14225. Radio units 14200 may communicate directly with hardware nodes 1430 via one or more appropriate network interfaces and may be used in combination with the virtual components to provide a virtual node with radio capabilities, such as a radio access node or a base station.

In some embodiments, some signaling can be affected with the use of control system 14230 which may alternatively be used for communication between the hardware nodes 1430 and radio units 14200.

FIG. 15A illustrates connectivity between network devices (NDs) within an exemplary network, as well as three exemplary implementations of the NDs, according to some embodiments of the invention FIG. 15A shows NDs 1500A-H, and their connectivity by way of lines between 1500A-1500B, 1500B-1500C, 1500C-1500D, 1500D-1500E, 1500E-1500F, 1500F-1500G, and 1500A-1500G, as well as between 1500H and each of 1500A, 1500C, 1500D, and 1500G. These NDs are physical devices, and the connectivity between these NDs can be wireless or wired (often referred to as a link). An additional line extending from NDs 1500A, 1500E, and 1500F illustrates that these NDs act as ingress and egress points for the network (and thus, these NDs are sometimes referred to as edge NDs; while the other NDs may be called core NDs).

Two of the exemplary ND implementations in FIG. 15A are: 1) a special-purpose network device 1502 that uses custom application-specific integrated-circuits (ASICs) and a special-purpose operating system (OS); and 2) a general purpose network device 1504 that uses common off-the-shelf (COTS) processors and a standard OS.

The special-purpose network device 1502 includes networking hardware 1510 comprising a set of one or more processor(s) 1512, forwarding resource(s) 1514 (which typically include one or more ASICs and/or network processors), and physical network interfaces (NIs) 1516 (through which network connections are made, such as those shown by the connectivity between NDs 1500A-H), as well as non-transitory machine readable storage media 1518 having stored therein networking software 1520. During operation, the networking software 1520 may be executed by the networking hardware 1510 to instantiate a set of one or more networking software instance(s) 1522. Each of the networking software instance(s) 1522, and that part of the networking hardware 1510 that executes that network software instance (be it hardware dedicated to that networking software instance and/or time slices of hardware temporally shared by that networking software instance with others of the networking software instance(s) 1522), form a separate virtual network element 1530A-R. Each of the virtual network element(s) (VNEs) 1530A-R includes a control communication and configuration module 1532A-R (sometimes referred to as a local control module or control communication module) and forwarding table(s) 1534A-R, such that a given virtual network element (e.g., 1530A) includes the control communication and configuration module (e.g., 1532A), a set of one or more forwarding table(s) (e.g., 1534A), and that portion of the networking hardware 1510 that executes the virtual network element (e.g., 1530A). In some embodiments, the networking software can include aspects of the object tracking services 1565. Any component of the object tracking services 1565 can be implemented in the networking software 1520. Similarly, the networking software 1518 can include aspects of the edgecloud software 1567. Any component of the edgecloud software 1567 can be implemented in combination with the networking software 1520 and the object tracking services 1565.

The special-purpose network device 1502 is often physically and/or logically considered to include: 1) a ND control plane 1524 (sometimes referred to as a control plane) comprising the processor(s) 1512 that execute the control communication and configuration module(s) 1532A-R; and 2) a ND forwarding plane 1526 (sometimes referred to as a forwarding plane, a data plane, or a media plane) comprising the forwarding resource(s) 1514 that utilize the forwarding table(s) 1534A-R and the physical NIs 1516. By way of example, where the ND is a router (or is implementing routing functionality), the ND control plane 1524 (the processor(s) 1512 executing the control communication and configuration module(s) 1532A-R) is typically responsible for participating in controlling how data (e.g., packets) is to be routed (e.g., the next hop for the data and the outgoing physical NI for that data) and storing that routing information in the forwarding table(s) 1534A-R, and the ND forwarding plane 1526 is responsible for receiving that data on the physical NIs 1516 and forwarding that data out the appropriate ones of the physical NIs 1516 based on the forwarding table(s) 1534A-R.

FIG. 15B illustrates an exemplary way to implement the special-purpose network device 1502 according to some embodiments of the invention. FIG. 15B shows a special-purpose network device including cards 1538 (typically hot pluggable). While in some embodiments the cards 1538 are of two types (one or more that operate as the ND forwarding plane 1526 (sometimes called line cards), and one or more that operate to implement the ND control plane 1524 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 1536 (e.g., a first full mesh coupling the line cards and a second full mesh coupling all of the cards).

Returning to FIG. 15A, the general purpose network device 1504 includes hardware 1540 comprising a set of one or more processor(s) 1542 (which are often COTS processors) and physical NIs 1546, as well as non-transitory machine readable storage media 1548 having stored therein software 1550. During operation, the processor(s) 1542 execute the software 1550 to instantiate one or more sets of one or more applications 1564A-R. While one embodiment does not implement virtualization, alternative embodiments may use different forms of virtualization. For example, in one such alternative embodiment the virtualization layer 1554 represents the kernel of an operating system (or a shim executing on a base operating system) that allows for the creation of multiple instances 1562A-R called software containers that may each be used to execute one (or more) of the sets of applications 1564A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 1554 represents a hypervisor (sometimes referred to as a virtual machine monitor (VMM)) or a hypervisor executing on top of a host operating system, and each of the sets of applications 1564A-R is run on top of a guest operating system within an instance 1562A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 1540, directly on a hypervisor (in which case the unikernel is sometimes described as running within a LibOS virtual machine), or in a software container, embodiments can be implemented fully with unikernels running directly on a hypervisor represented by virtualization layer 1554, unikernels running within software containers represented by instances 1562A-R, or as a combination of unikernels and the above-described techniques (e.g., unikernels and virtual machines both run directly on a hypervisor, unikernels and sets of applications that are run in different software containers).

The instantiation of the one or more sets of one or more applications 1564A-R, as well as virtualization if implemented, are collectively referred to as software instance(s) 1552. Each set of applications 1564A-R, corresponding virtualization construct (e.g., instance 1562A-R) if implemented, and that part of the hardware 1540 that executes them (be it hardware dedicated to that execution and/or time slices of hardware temporally shared), forms a separate virtual network element(s) 1560A-R. In some embodiments, the applications 1564A-R, and the software 1550 can encompass elements of the Object tracking services 1565. Any component or function of the Object tracking services 1565 can be implemented as applications 1564A-R and as part of the software 1550. Similarly, the software 1550 can include aspects of the edgecloud software 1567. Any component of the edgecloud software 1567 can be implemented in combination with the software 1520 and the object tracking services 1565.

The virtual network element(s) 1560A-R perform similar functionality to the virtual network element(s) 1530A-R—e.g., similar to the control communication and configuration module(s) 1532A and forwarding table(s) 1534A (this virtualization of the hardware 1540 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 1562A-R corresponding to one VNE 1560A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 1562A-R to VNEs also apply to embodiments where such a finer level of granularity and/or unikernels are used.

In certain embodiments, the virtualization layer 1554 includes a virtual switch that provides similar forwarding services as a physical Ethernet switch. Specifically, this virtual switch forwards traffic between instances 1562A-R and the physical NI(s) 1546, as well as optionally between the instances 1562A-R, in addition, this virtual switch may enforce network isolation between the VNEs 1560A-R that by policy are not permitted to communicate with each other (e.g., by honoring virtual local area networks (VLANs)).

The third exemplary ND implementation in FIG. 15A is a hybrid network device 1506, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 1502) could provide for para-virtualization to the networking hardware present in the hybrid network device 1506.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also, in all of the above exemplary implementations, each of the VNEs (e.g., VNE(s) 1530A-R, VNEs 1560A-R, and those in the hybrid network device 1506) receives data on the physical NIs (e.g., 1516, 1546) and forwards that data out the appropriate ones of the physical NIs (e.g., 1516, 1546). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 15C:
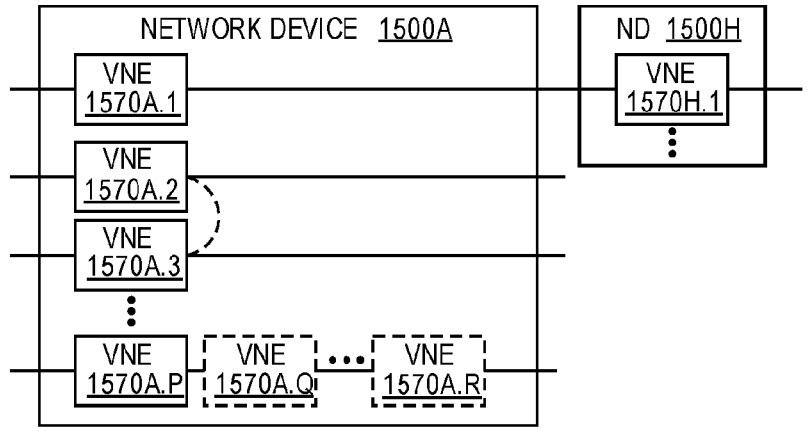
FIG. 15C illustrates various exemplary ways in which virtual network elements (VNEs) may be coupled according to some embodiments of the invention.

FIG. 15C illustrates various exemplary ways in which VNEs may be coupled according to some embodiments of the invention. FIG. 15C shows VNEs 1570A.1-1570A.P (and optionally VNEs 1570A.Q-1570A.R) implemented in ND 1500A and VNE 1570H.1 in ND 1500H. In FIG. 15C, VNEs 1570A.1-P are separate from each other in the sense that they can receive packets from outside ND 1500A and forward packets outside of ND 1500A; VNE 1570A.1 is coupled with VNE 1570H.1, and thus they communicate packets between their respective NDs; VNE 1570A.2-1570A.3 may optionally forward packets between themselves without forwarding them outside of the ND 1500A; and VNE 1570A.P may optionally be the first in a chain of VNEs that includes VNE 1570A.Q followed by VNE 1570A.R (this is sometimes referred to as dynamic service chaining, where each of the VNEs in the series of VNEs provides a different service—e.g., one or more layer 4-7 network services). While FIG. 15C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 15A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 15A may also host one or more such servers (e.g., in the case of the general purpose network device 1504, one or more of the software instances 1562A-R may operate as servers; the same would be true for the hybrid network device 1506; in the case of the special-purpose network device 1502, one or more such servers could also be run on a virtualization layer executed by the processor(s) 1512); in which case the servers are said to be co-located with the VNEs of that ND.

A virtual network is a logical abstraction of a physical network (such as that in FIG. 15A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs, the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 15D:
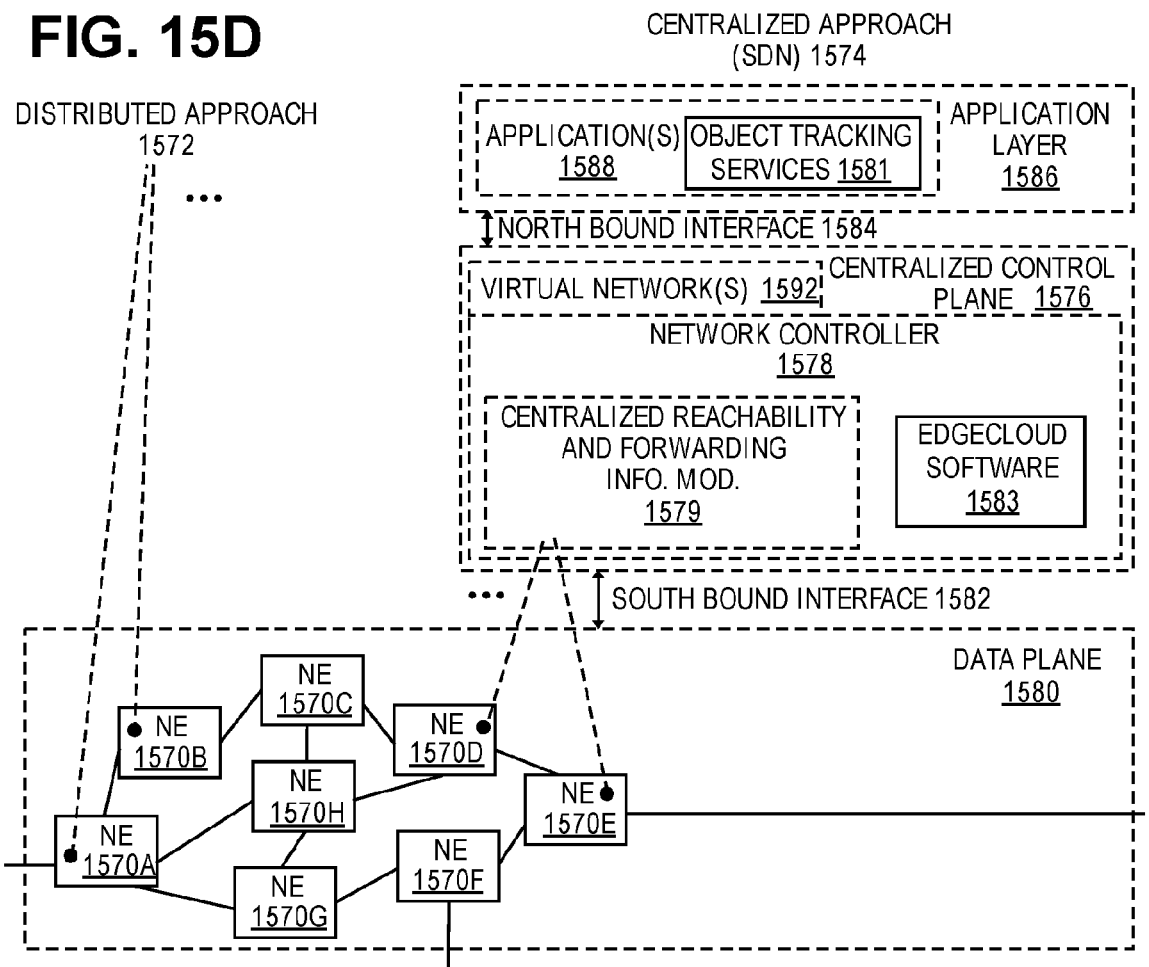
FIG. 15D illustrates a network with a single network element (NE) on each of the NDs, and within this straightforward approach contrasts a traditional distributed approach (commonly used by traditional routers) with a centralized approach for maintaining reachability and forwarding information (also called network control), according to some embodiments of the invention.

FIG. 15D illustrates a network with a single network element on each of the NDs of FIG. 15A, and within this straightforward approach contrasts a traditional distributed approach (commonly used by traditional routers) with a centralized approach for maintaining reachability and forwarding information (also called network control), according to some embodiments of the invention. Specifically, FIG. 15D illustrates network elements (NEs) 1570A-H with the same connectivity as the NDs 1500A-H of FIG. 15A.

FIG. 15D illustrates that the distributed approach 1572 distributes responsibility for generating the reachability and forwarding information across the NEs 1570A-H; in other words, the process of neighbor discovery and topology discovery is distributed.

For example, where the special-purpose network device 1502 is used, the control communication and configuration module(s) 1532A-R of the ND control plane 1524 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 1570A-H (e.g., the processor(s) 1512 executing the control communication and configuration module(s) 1532A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 1524. The ND control plane 1524 programs the ND forwarding plane 1526 with information (e.g., adjacency and route information) based on the routing structure(s). For example, the ND control plane 1524 programs the adjacency and route information into one or more forwarding table(s) 1534A-R (e.g., Forwarding Information Base (FIB), Label Forwarding Information Base (LFIB), and one or more adjacency structures) on the ND forwarding plane 1526. For layer 2 forwarding, the ND can store one or more bridging tables that are used to forward data based on the layer 2 information in that data. While the above example uses the special-purpose network device 1502, the same distributed approach 1572 can be implemented on the general purpose network device 1504 and the hybrid network device 1506.

FIG. 15D illustrates that a centralized approach 1574 (also known as software defined networking (SDN)) that decouples the system that makes decisions about where traffic is sent from the underlying systems that forwards traffic to the selected destination. The illustrated centralized approach 1574 has the responsibility for the generation of reachability and forwarding information in a centralized control plane 1576 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 1576 has a south bound interface 1582 with a data plane 1580 (sometime referred to the infrastructure layer, network forwarding plane, or forwarding plane (which should not be confused with a ND forwarding plane)) that includes the NEs 1570A-H (sometimes referred to as switches, forwarding elements, data plane elements, or nodes). The centralized control plane 1576 includes a network controller 1578, which includes a centralized reachability and forwarding information module 1579 that determines the reachability within the network and distributes the forwarding information to the NEs 1570A-H of the data plane 1580 over the south bound interface 1582 (which may use the OpenFlow protocol). Thus, the network intelligence is centralized in the centralized control plane 1576 executing on electronic devices that are typically separate from the NDs.

For example, where the special-purpose network device 1502 is used in the data plane 1580, each of the control communication and configuration module(s) 1532A-R of the ND control plane 1524 typically include a control agent that provides the VNE side of the south bound interface 1582. In this case, the ND control plane 1524 (the processor(s) 1512 executing the control communication and configuration module(s) 1532A-R) performs its responsibility for participating in controlling how data (e.g., packets) is to be routed (e.g., the next hop for the data and the outgoing physical NI for that data) through the control agent communicating with the centralized control plane 1576 to receive the forwarding information (and in some cases, the reachability information) from the centralized reachability and forwarding information module 1579 (it should be understood that in some embodiments of the invention, the control communication and configuration module(s) 1532A-R, in addition to communicating with the centralized control plane 1576, may also play some role in determining reachability and/or calculating forwarding information—albeit less so than in the case of a distributed approach; such embodiments are generally considered to fall under the centralized approach 1574, but may also be considered a hybrid approach).

While the above example uses the special-purpose network device 1502, the same centralized approach 1574 can be implemented with the general purpose network device 1504 (e.g., each of the VNE 1560A-R performs its responsibility for controlling how data (e.g., packets) is to be routed (e.g., the next hop for the data and the outgoing physical NI for that data) by communicating with the centralized control plane 1576 to receive the forwarding information (and in some cases, the reachability information) from the centralized reachability and forwarding information module 1579; it should be understood that in some embodiments of the invention, the VNEs 1560A-R, in addition to communicating with the centralized control plane 1576, may also play some role in determining reachability and/or calculating forwarding information albeit less so than in the case of a distributed approach) and the hybrid network device 1506. In fact, the use of SDN techniques can enhance the NFV techniques typically used in the general purpose network device 1504 or hybrid network device 1506 implementations as NFV is able to support SDN by providing an infrastructure upon which the SDN software can be run, and NFV and SDN both aim to make use of commodity server hardware and physical switches.

FIG. 15D also shows that the centralized control plane 1576 has a north bound interface 1584 to an application layer 1586, in which resides application(s) 1588. The centralized control plane 1576 has the ability to form virtual networks 1592 (sometimes referred to as a logical forwarding plane, network services, or overlay networks (with the NEs 1570A-H of the data plane 1580 being the underlay network)) for the application(s) 1588. Thus, the centralized control plane 1576 maintains a global view of all NDs and configured NEs/VNEs, and it maps the virtual networks to the underlying NDs efficiently (including maintaining these mappings as the physical network changes either through hardware (ND, link, or ND component) failure, addition, or removal). In some embodiments, the applications 1588 can encompass elements of the Object tracking services 1581. Any component or function of the Object tracking services 1581 can be implemented as applications 1588. Similarly, the centralized control plane 1576 can include aspects of the edgecloud software 1583. Any component of the edgecloud software 1583 can be implemented in combination with the centralized control plane 1576 and the object tracking services 1581.

While FIG. 15D shows the distributed approach 1572 separate from the centralized approach 1574, the effort of network control may be distributed differently or the two combined in certain embodiments of the invention. For example: 1) embodiments may generally use the centralized approach (SDN) 1574, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 1574 but may also be considered a hybrid approach.

While FIG. 15D illustrates the simple case where each of the NDs 1500A-H implements a single NE 1570A-H, it should be understood that the network control approaches described with reference to FIG. 15D also work for networks where one or more of the NDs 1500A-H implement multiple VNEs (e.g., VNEs 1530A-R, VNEs 1560A-R, those in the hybrid network device 1506). Alternatively, or in addition, the network controller 1578 may also emulate the implementation of multiple VNEs in a single ND. Specifically, instead of (or in addition to) implementing multiple VNEs in a single ND, the network controller 1578 may present the implementation of a VNE/NE in a single ND as multiple VNEs in the virtual networks 1592 (all in the same one of the virtual network(s) 1592, each in different ones of the virtual network(s) 1592, or some combination). For example, the network controller 1578 may cause an ND to implement a single VNE (a NE) in the underlay network, and then logically divide up the resources of that NE within the centralized control plane 1576 to present different VNEs in the virtual network(s) 1592 (where these different VNEs in the overlay networks are sharing the resources of the single VNE/NE implementation on the ND in the underlay network).

Figure 15E:
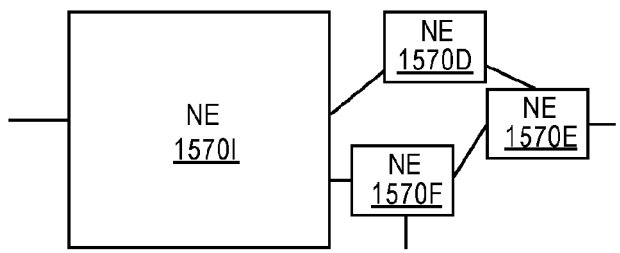
FIG. 15E illustrates the simple case of where each of the NDs implements a single NE, but a centralized control plane has abstracted multiple of the NEs in different NDs into (to represent) a single NE in one of the virtual network(s), according to some embodiments of the invention.
Figure 15F:
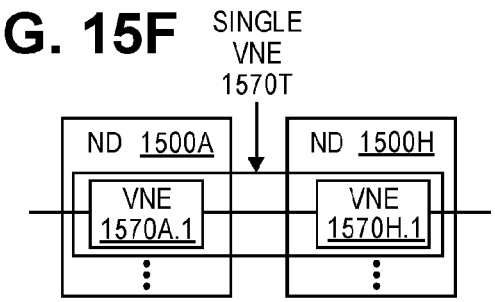
FIG. 15F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 15E and 15F respectively illustrate exemplary abstractions of NEs and VNEs that the network controller 1578 may present as part of different ones of the virtual networks 1592. FIG. 15E illustrates the simple case of where each of the NDs 1500A-H implements a single NE 1570A-H (see FIG. 15D), but the centralized control plane 1576 has abstracted multiple of the NEs in different NDs (the NEs 1570A-C and G-H) into (to represent) a single NE 1570I in one of the virtual network(s) 1592 of FIG. 15D, according to some embodiments of the invention. FIG. 15E shows that in this virtual network, the NE 1570I is coupled to NE 1570D and 1570F, which are both still coupled to NE 1570E.

FIG. 15F illustrates a case where multiple VNEs (VNE 1570A.1 and VNE 1570H.1) are implemented on different NDs (ND 1500A and ND 1500H) and are coupled to each other, and where the centralized control plane 1576 has abstracted these multiple VNEs such that they appear as a single VNE 1570T within one of the virtual networks 1592 of FIG. 15D, according to some embodiments of the invention. Thus, the abstraction of a NE or VNE can span multiple NDs.

While some embodiments of the invention implement the centralized control plane 1576 as a single entity (e.g., a single instance of software running on a single electronic device), alternative embodiments may spread the functionality across multiple entities for redundancy and/or scalability purposes (e.g., multiple instances of software running on different electronic devices).

Figure 16:
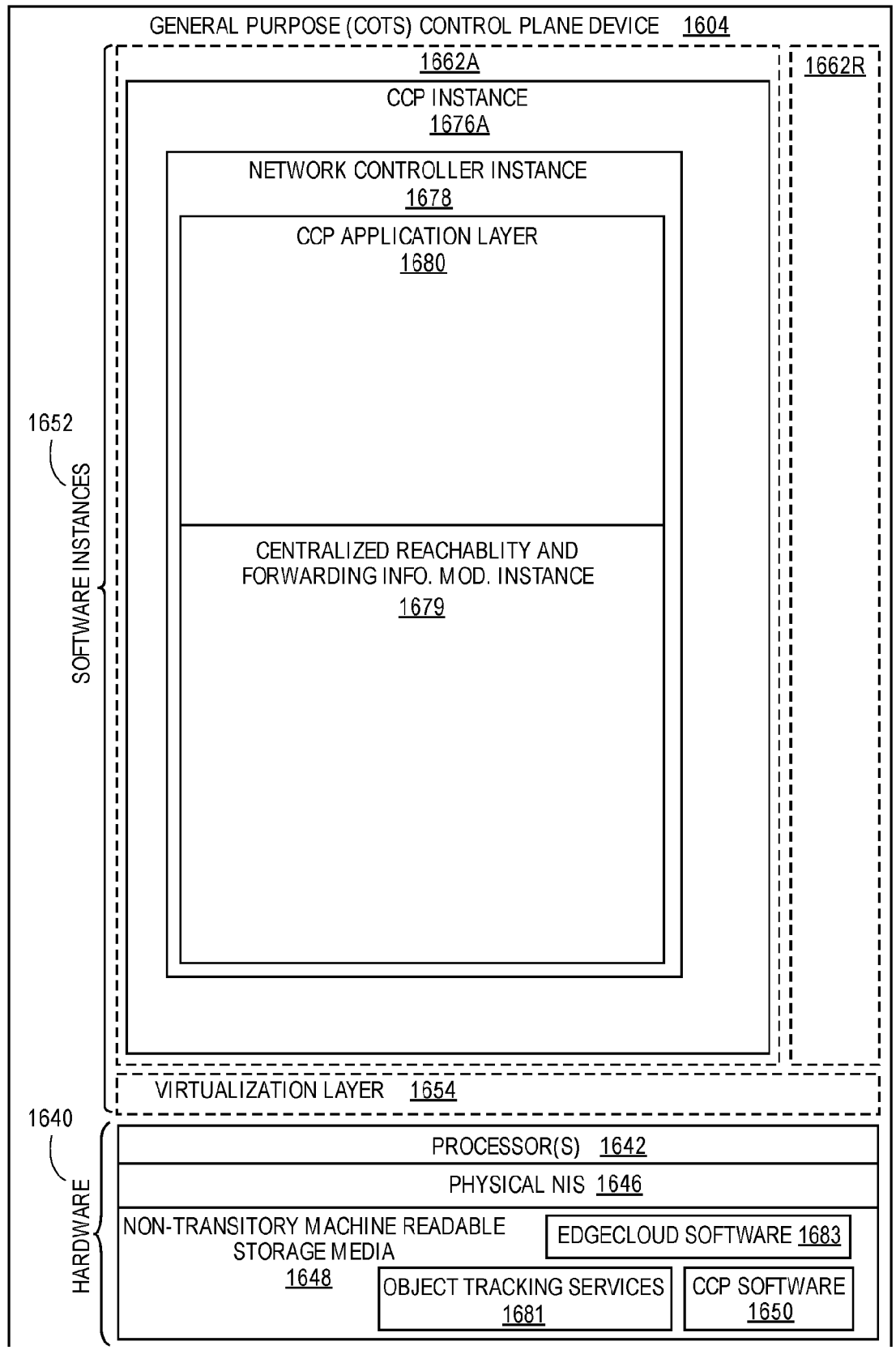
FIG. 16 illustrates a general purpose control plane device with centralized control plane (CCP) software 'B50), according to some embodiments of the invention.

Similar to the network device implementations, the electronic device(s) running the centralized control plane 1576, and thus the network controller 1578 including the centralized reachability and forwarding information module 1579, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 16 illustrates, a general purpose control plane device 1604 including hardware 1640 comprising a set of one or more processor(s) 1642 (which are often COTS processors) and physical NIs 1646, as well as non-transitory machine readable storage media 1648 having stored therein centralized control plane (CCP) software 1650. In some embodiments, the software of the control plane device 1604 and software stored in the storage 1648 can encompass elements of the object tracking services 1681. Any component or function of the object tracking services 1681 can be implemented in the control plane device 1604. Similarly, the networking software 1518 can include aspects edgecloud software 1567. Any component of the edgecloud software 1567 can be implemented in combination with the networking software 1520 and the object tracking services 1565.

In embodiments that use compute virtualization, the processor(s) 1642 typically execute software to instantiate a virtualization layer 1654 (e.g., in one embodiment the virtualization layer 1654 represents the kernel of an operating system (or a shim executing on a base operating system) that allows for the creation of multiple instances 1662A-R called software containers (representing separate user spaces and also called virtualization engines, virtual private servers, or jails) that may each be used to execute a set of one or more applications; in another embodiment the virtualization layer 1654 represents a hypervisor (sometimes referred to as a virtual machine monitor (VMM)) or a hypervisor executing on top of a host operating system, and an application is run on top of a guest operating system within an instance 1662A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1640, directly on a hypervisor represented by virtualization layer 1654 (in which case the unikernel is sometimes described as running within a LibOS virtual machine), or in a software container represented by one of instances 1662A-R). Again, in embodiments where compute virtualization is used, during operation an instance of the CCP software 1650 (illustrated as CCP instance 1676A) is executed (e.g., within the instance 1662A) on the virtualization layer 1654. In embodiments where compute virtualization is not used, the CCP instance 1676A is executed, as a unikernel or on top of a host operating system, on the "bare metal" general purpose control plane device 1604. The instantiation of the CCP instance 1676A, as well as the virtualization layer 1654 and instances 1662A-R if implemented, are collectively referred to as software instance(s) 1652.

In some embodiments, the CCP instance 1676A includes a network controller instance 1678. The network controller instance 1678 includes a centralized reachability and forwarding information module instance 1679 (which is a middleware layer providing the context of the network controller 1678 to the operating system and communicating with the various NEs), and an CCP application layer 1680 (sometimes referred to as an application layer) over the middleware layer (providing the intelligence required for various network operations such as protocols, network situational awareness, and user—interfaces). At a more abstract level, this CCP application layer 1680 within the centralized control plane 1676 works with virtual network view(s) (logical view(s) of the network) and the middleware layer provides the conversion from the virtual networks to the physical view.

The centralized control plane 1676 transmits relevant messages to the data plane 1680 based on CCP application layer 1680 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 1580 may receive different messages, and thus different forwarding information. The data plane 1580 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPV4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 1580, the packet (or a subset of the packet header and content) is typically forwarded to the centralized control plane 1576. The centralized control plane 1576 will then program forwarding table entries into the data plane 1580 to accommodate packets belonging to the flow of the unknown packet. Once a specific forwarding table entry has been programmed into the data plane 1580 by the centralized control plane 1576, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a user device to track objects in an extended reality (XR) environment comprising:
   capturing an image of a physical environment associated with the XR environment;
   sending the image, a first timestamp for the image, and object information for at least one object in the image to a tracking service;
   receiving an object identifier, object tracking information, and a second timestamp for the at least one object from the tracking service;
   performing time and motion compensation on the object tracking information to correlate the object tracking information and object identifier with the at least one object in the image of the physical environment; and
   generating or updating an XR overlay for the at least one object using time and motion compensated object tracking information.

2. The method of claim 1, further comprising:
   performing low resource object identification to identify the at least one object in the image.

3. The method of claim 1, further comprising:
   performing low resource object tracking for the at least one object.

4. The method of claim 1, wherein the object tracking information includes a position of the at least one object and a motion probability field (MPF) for the at least one object.

5. The method of claim 4, wherein the MPF incorporates object tracking information collected by other devices in the XR environment.

6. The method of claim 1, wherein the time and motion compensation predicts a current position of the at least one object based on a previous position of the at least one object, a direction of the at least one object, the first timestamp for the image, the second timestamp, a motion probability field (MPF), and end-to-end latency.

7. A device to track objects in an extended reality (XR) environment comprising:
   a storage medium having stored therein an object tracking service; and
   a processor coupled to the storage medium, wherein the processor to execute the object tracking service and the object tracking service to:
      capture an image of a physical environment associated with the XR environment;
      send the image, a first timestamp for the image, and object information for at least one object in the image to a tracking service;
      receive an object identifier, object tracking information, and a second timestamp for the at least one object from the tracking service;
      perform time and motion compensation on the object tracking information to correlate the object tracking information and object identifier with the at least one object in the image of the physical environment; and
      generate or update an XR overlay for the at least one object using time and motion compensated object tracking information.

8. The device of claim 7, wherein the object tracking service is further to perform low resource object identification to identify the at least one object in the image.

9. The device of claim 7, wherein the object tracking service is further to perform low resource object tracking for the at least one object.

10. The device of claim 7, wherein the object tracking information includes a position of the at least one object and a motion probability field (MPF) for the at least one object.

11. The device of claim 10, wherein the MPF incorporates object tracking information collected by other devices in the XR environment.

12. The device of claim 7, wherein the time and motion compensation predicts a current position of the at least one object based on a previous position of the at least one object, a direction of the at least one object, the first timestamp for the image, the second timestamp, a motion probability field (MPF), and end-to-end latency.

13. A method of an object tracking service to track objects in an extended reality (XR) environment comprising:
   receiving an image, object information, and a first timestamp from a first user device;
   performing object identification on the image;
   determining an object identifier for at least one object in the image;
   determining position compensation information for the at least one object;
   updating a motion probability field (MPF) based on the position compensation information, the at least one object, and object information; and
   sending the object identifier, object tracking information including the MPF, and a second timestamp to the first user device.

14. The method of claim 13, further comprising:
   receiving object information from a second user device.

15. The method of claim 13, further comprising:
   updating or generating the MPF.

16. The method of claim 13, wherein the object tracking information includes a position of the at least one object.

17. The method of claim 16, wherein the MPF incorporates object tracking information collected by a second user device in the XR environment.

18. A device to track objects in an extended reality (XR) environment comprising:
   a storage medium having stored therein an object tracking service; and
   a processor coupled to the storage medium, wherein the processor to execute the object tracking service and the object tracking service to:

receive an image, object information, and a first timestamp from a first user device;

perform object identification on the image;

determine an object identifier for at least one object in the image;

determine position compensation information for the at least one object;

update a motion probability field (MPF) based on the position compensation information, the at least one object, and object information; and send the object identifier, object tracking information including the MPF, and a second timestamp to the first user device.

19. The device of claim 18, wherein the object tracking service further to receive object information from a second user device.

20. The device of claim 18, wherein the object tracking service further to update or generating the MPF.

* * * * *